(12) United States Patent
Aggarwal

(10) Patent No.: US 6,985,944 B2
(45) Date of Patent: Jan. 10, 2006

(54) DISTRIBUTING QUERIES AND COMBINING QUERY RESPONSES IN A FAULT AND PERFORMANCE MONITORING SYSTEM USING DISTRIBUTED DATA GATHERING AND STORAGE

(75) Inventor: Vikas Aggarwal, West Windsor, NJ (US)

(73) Assignee: Fidelia Technology, Inc., Princeton, NJ (US)

( * ) Notice: Subject to any disclaimer, the term of this patent is extended or adjusted under 35 U.S.C. 154(b) by 212 days.

(21) Appl. No.: 10/286,469

(22) Filed: Nov. 1, 2002

(65) Prior Publication Data

US 2004/0088405 A1 May 6, 2004

(51) Int. Cl.
G06F 15/173 (2006.01)

(52) U.S. Cl. .......................... 709/224; 707/3
(58) Field of Classification Search ................ 707/103, 707/104.1, 20, 102, 3; 709/224, 223; 370/252
See application file for complete search history.

(56) References Cited

U.S. PATENT DOCUMENTS

| | | | |
|---|---|---|---|
| 6,157,618 A | * | 12/2000 | Boss et al. ................. 370/252 |
| 6,374,254 B1 | * | 4/2002 | Cochran et al. ............. 707/102 |
| 6,389,426 B1 | * | 5/2002 | Turnbull et al. ............. 707/102 |
| 6,418,445 B1 | * | 7/2002 | Moerbeek ................ 707/103 X |
| 6,418,467 B1 | * | 7/2002 | Schweitzer et al. ......... 709/223 |
| 6,687,714 B1 | * | 2/2004 | Kogen et al. ................ 707/200 |
| 6,701,324 B1 | * | 3/2004 | Nair et al. ................ 707/104.1 |
| 6,711,615 B2 | * | 3/2004 | Porras et al. ................ 709/224 |
| 6,751,661 B1 | * | 6/2004 | Geddes ........................ 709/223 |

\* cited by examiner

*Primary Examiner*—John Follansbee
*Assistant Examiner*—Jungwon Chang
(74) *Attorney, Agent, or Firm*—Straub & Pokotylo; John C. Pokotylo

(57) ABSTRACT

Combining system fault and performance monitoring using distributed data collection and storage of performance data. Storage requirements are relaxed and real-time performance monitoring is possible. Data collection and storage elements can be easily configured via a central configuration database. The configuration database can be easily updated and changed. A federated user model allows normal end users to monitor devices relevant to the part of a service they are responsible for, while allowing administrative users to view the fault and performance of a service in an end-to-end manner.

24 Claims, 19 Drawing Sheets

Event Report
All devices by test/severity.
Select a column to sort report results.

Event Summary 9/1/02 - 9/30/02

| DEVICE | TEST | TYPE | SEVERITY | DURATION | UPTIME | COUNT |
|---|---|---|---|---|---|---|
| App Server (SAP) | Incoming Network Traffic | snmp/interface_bytes_rate | Critical | 21d 04h 26m | 29% | 1131 |
| App Server (SAP) | Outgoing Network Traffic | snmp/interface_bytes_rate | Critical | 2d 01h 39m | 93% | 410 |
| Foundry | Fa-1 Traffic Out | snmp/interface_bytes_rate | Critical | 0d 23h 50m | 96% | 271 |
| Oracle Data Warehouse | CPU Load | snmp/cpu | Critical | 0d 07h 59m | 98% | 63 |
| Order Entry Gateway Server | Packet Loss | ping/pl | Critical | 0d 03h 38m | 99% | 56 |
| App Server (SAP) | Outgoing Network Traffic | snmp/interface_bytes_rate | Warning | 11d 06h 22m | 62% | 1235 |
| App Server (SAP) | Incoming Network Traffic | snmp/interface_bytes_rate | Warning | 8d 17h 03m | 70% | 1110 |
| Foundry | Fa-1 Traffic Out | snmp/interface_bytes_rate | Warning | 7d 06h 27m | 75% | 1367 |
| CNC Server - PA (NT) | SAP Query | ping/rtt | Warning | 6d 01h 29m | 79% | 230 |
| Cisco Router | Fa-1/0/0 Traffic in | snmp/interface_bytes_rate | Warning | 2d 03h 06m | 92% | 525 |
| Cisco Router | Fa-1/0/0 Traffic Out | snmp/interface_bytes_rate | Warning | 1d 10h 15m | 95% | 374 |
| Internet Services | Round Trip Time | ping/rtt | Warning | 0d 12h 32m | 98% | 174 |
| Oracle Data Warehouse | CPU Load | snmp/cpu | Warning | 0d 11h 00m | 98% | 129 |

FIGURE 12

Test Summary

Account: Widgetronics_Albany
Device: eCommerce
Select a test name below to view a graphical test history.
Service performance for the last 24 hours Displaying 1 - 10 of 10

| STATUS | DEVICE | TEST | VALUE | WARN/CRIT | TEST TIME | DURATION | HELP |
|---|---|---|---|---|---|---|---|
| | Oracle Data Warehouse | Oracle SYSTEM Table Util | 97 % | 97/99 | 4:46 PM | 1d 11:42 | |
| | Oracle Data Warehouse | Disk /export/data | 88 % | 87/90 | 4:45 PM | 1d 11:42 | |
| | Cisco Router | Packet Loss | 0 % | 1/5 | 4:46 PM | 01:23 | |
| | App Server (SAP) | Application Response | 119 ms | 145/200 | 4:48 PM | 01:55 | |
| | Oracle Data Warehouse | Oracle ORAD6.AVALON Page Reads | 0 reads/sec | 1000/2000 | 4:46 PM | 1d 11:37 | |
| | Oracle Data Warehouse | Oracle ORAD6.AVALON Disk Writes | 0 writes/sec | 1000/2000 | 4:46 PM | 1d 11:37 | |
| | Oracle Data Warehouse | Oracle ORAD5.AVALON Transactions | 0 tx/sec | 100/200 | 4:46 PM | 1d 11:37 | |
| | App Server (SAP) | CPU Load | 3 % | 85/95 | 4:48 PM | 1d 11:40 | |
| | Oracle Data Warehouse | Oracle Table INDX Size | 0 % | 50/80 | 4:46 PM | 1d 11:42 | |
| | Oracle Data Warehouse | SQL Query | SUSPENDED | 100/400 | 4:41 PM | 11989d 12:37 | | okay   warning   critical   unknown   help   unreachable   suspended   notconfigured   modify

Test Details
eCommerce - Performance and Event History

Account: Widgetronics_Albany
Device: eCommerce
Test: CPU Load
Events for the last 24 hours
View raw data
View historical graphs
View trend analysis FIGURE 14A
Service Instability Report
8/1/02 - 8/31/02
Top 10 services by number of events
| Service | Avg Duration (Warn) | # Events (Warn) |
|---|---|---|
| Telesales | 0d 08h 45m | 1880 |
| twar | 1d 05h 48m | 503 |
| Manufacturing | 1d 10h 28m | 432 |
| eCommerce | 0d 01h 21m | 375 |
| Finance Service | 0d 00h 23m | 300 |
| Customer Service | 3d 17h 28m | 171 |
| Test | 0d 00h 06m | 47 |
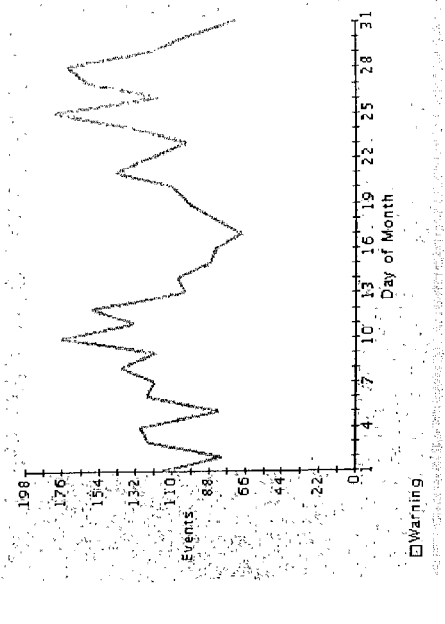
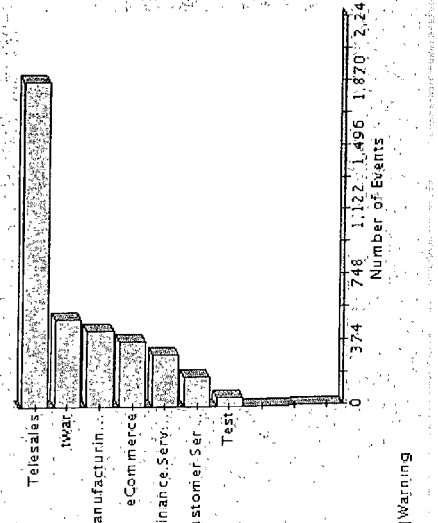

FIGURE 15

Usage & Trend Report

Top 10 Disk Usage tests (sorted by mean)
8/1/02 - 8/31/02

| Device | Test | 98th Percentile | 95th Percentile | Mean | Std Dev | Min | Max | Units |
|---|---|---|---|---|---|---|---|---|
| Order Entry Gateway Server | Disk /vol | 72 | 72 | 72 | 0 | 72 | 72 | % |
| Order Entry Gateway Server | Disk / | 72 | 72 | 69.7 | 11.71 | 10 | 72 | % |
| Order Entry Gateway Server | Disk /export/archive | 61 | 61 | 58.59 | 10.52 | 5 | 62 | % |
| Order Entry Gateway Server | Disk /var | 54 | 54 | 53.7 | 9.4 | 3 | 57 | % |
| Order Entry Gateway Server | Disk /tmp | 3 | 3 | 1.89 | 1.45 | 0 | 3 | % |
| Order Entry Gateway Server | Disk /spare | 0 | 0 | 0 | 0 | 0 | 0 | % |

Tests Approaching Thresholds (Disk Usage)

| Device | Test | Threshold (Warning/Critical) | Projected Time (Warning/Critical) |
|---|---|---|---|
| Order Entry Gateway Server | Disk /var | 75 / 90 | 296 days / - |

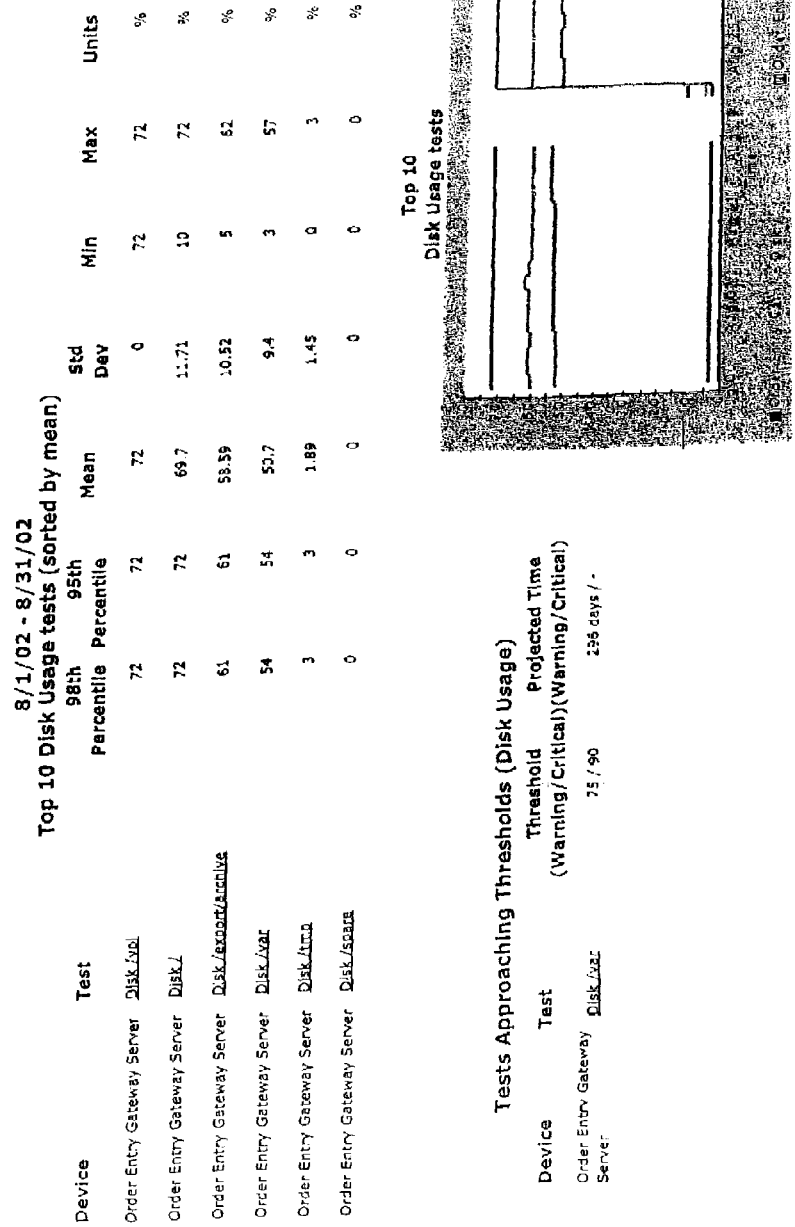

Top 10 Disk Usage tests

FIGURE 17

Service Status Summary
Account: widget_admin
Turn On Filter
View Messages

Displaying 1 - 9 of 9

| | SERVICE | ACCOUNT | NETWORK | SYSTEM | APPLICATION |
|---|---|---|---|---|---|
| | davics service | widget_admin | | | |
| ▲ | Manufacturing | Widgetronics_Albany | | | |
| ▲ | Telesales | Widgetronics_Albany | | | |
| ▲ | Test | Widgetronics_Albany | | | |
| ▲ | twar | Widgetronics_Albany | | | |
| ▲ | Support Services | Widgetronics_Boston | | | |
| △ | Customer Service | Widgetronics_Albany | | | |
| △ | eCommerce | Widgetronics_Albany | | | |
| △ | Finance Service | Widgetronics_Albany | | | |

Legend: warning | critical | unknown | help | unreachable | suspended | notconfigured | modify | okay

DISTRIBUTING QUERIES AND COMBINING QUERY RESPONSES IN A FAULT AND PERFORMANCE MONITORING SYSTEM USING DISTRIBUTED DATA GATHERING AND STORAGE

§ 1. BACKGROUND OF THE INVENTION

§ 1.1 Field of the Invention

The present invention concerns network management systems ("NMSs"). In particular, the present invention concerns combining fault and performance management.

§ 1.2 Description of Related Art

The description of art in this section is not, and should not be interpreted to be, an admission that such art is prior art to the present invention.

As computer, hardware, software and networking systems, and systems combining one or more of these systems, have become more complex, it has become more difficult to monitor the "health" of these systems. For example, FIG. 1 illustrates components of a system 100 that may be used by a so-called e-commerce business. As shown, this system may include a web interface server 110, a search and navigation server 120 associated with a product inventory database 125, a purchase or "shopping cart" server 130 associated with a user database 135, a payment server 140 associated with a credit card database 145, a transaction server 150 associated with a transaction database 155, a shipping server 180 associated with a shipping database 185, a local area network ("LAN") 160, and a network 170 including linked routers 175. As shown, the search and navigation server 120, the purchase or "shopping cart" server 130, the payment server 140 and the transaction server 150 may communicate with one another via the LAN 160. As further shown, these servers may communicate with the shipping server 180 via the network 170.

Each of the servers may include components (e.g., power supplies, power supply backups, printers, interfaces, CPUs, chassis, fans, memory, disk storage, etc.) and may run applications or operating systems (e.g., Windows, Linux, Solaris, Microsoft Exchange, etc.) that may need to be monitored. The various databases (e.g., Microsoft SQL Server, Oracle Database, etc.) may also need to be monitored. Finally, the networks, as well as their components, (e.g., routers, firewalls, switches, interfaces, protocols, etc.) may need to be monitored.

Although the system 100 includes various discreet servers, networks, and databases, the system can be thought of as offering an end-to-end service. In this exemplary system, that end-to-end service is on-line shopping—from browsing inventory, to product selection, to payment, to shipping.

Tools have been developed to monitor these systems. Such tools have come to be known as network management systems (NMSs). (The term network management systems should not be interpreted to be limited to monitoring networks—network management systems have been used to monitor things other than networks.) Traditionally, NMSs have performed either fault management, or performance management, but not both. Fault management pertains to whether something is operating or not. Performance management pertains to a measure of how well something is working and to historical and future trends.

A fault management system generates and works with "real time" events (exceptions). It can query the state of a device and trigger an event upon a state change or threshold violation. However, fault management systems typically do not store the polled data—they only store events and alerts (including SNMP traps which are essentially events). Generally, the user interface console for a fault management system is "exception" driven. That is, if a managed element is functioning, it is typically not even displayed. Generally, higher severity fault events are displayed with more prominence (e.g., at the top of a list of faults), and less critical events are displayed with less prominence (e.g., lower in the list).

On the other hand, performance management systems generally store all polled data. This stored data can then be used to analyze trends or to generate historical reports on numerical data collected. A major challenge in performance management systems is storing such large amounts of data. For example, just polling 20 variables every 5 minutes from 1000 devices generates 6 million data samples per day. Assuming each data sample requires 50 bytes of storage, about 9 GB of data will be needed per month. Consequently, performance management systems are designed to handle large volumes of data, perform data warehousing and reporting functions.

Performance management systems are typically batch oriented. More specifically, generally, distributed data collectors poll data and periodically (e.g., each night) feed them to a centralized database. Since the size of the centralized database will become huge, database management is a prime concern in such products.

As can be appreciated from the foregoing, conventional fault management systems are limited in that they do not store data gathered for later use in performance analysis. Conventional performance management systems are limited in that they require huge amounts of storage. Furthermore, since data is batched and sent to a centralized location for storage, the stored data can become "stale" if enough time has elapsed since the last batch of data was stored.

Furthermore, most enterprises currently use a minimum of two, if not more, products for information technology management. It is common to find several independent products being used by various departments within an enterprise to meet the basic needs of monitoring and performance management across networks, servers and applications. Moreover, since the performance and fault monitoring systems are disjointed, correlating data from these different systems is not trivial.

Recognizing that correlation between the collective information technology ("IT") infrastructure and business service is needed, several Manager of Manager ("MoM") tools have appeared in the market. These products interface with the various well known commercial tools and try to present a unified view to IT managers. Unfortunately, however, such integration is complex and requires depending on yet another product which needs to be learned and supported each time an underlying tool is updated. The addition of yet another tool just adds to the operational costs rather than reducing it.

In view of the foregoing limitations of existing network management systems, there is a need to simplify the processing related to monitoring faults and performance. There is also a need to monitor end-to-end service faults and performance of a service. Such needs should be met by a technique or system that is simple to install and administer, that has real-time capabilities, and that scales well in view of the large amount of data storage that may be required by a performance management system. Finally, there is a need to provide different users with different levels of monitoring, either for purposes of security, for purposes of software licensing, or both.

§ 2. SUMMARY OF THE INVENTION

The present invention discloses apparatus, data structures, and/or methods for distributing queries and combining query responses in a fault and performance monitoring system using distributed data gathering and storage.

§ 3. BRIEF DESCRIPTION OF THE DRAWINGS

FIGS. 11A and 11B illustrate an exemplary events report.

FIG. 12 illustrates an exemplary test status summary report.

FIGS. 14A and 14B illustrates an exemplary service instability report.

FIG. 15 illustrates an exemplary usage and trend report.

FIG. 17 illustrates an exemplary service status summary report.

§ 4. DETAILED DESCRIPTION

The present invention involves methods, apparatus and/or data structures for monitoring system faults and system performance. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not limited to the embodiments shown and the inventor regards his invention as the following disclosed methods, apparatus and data structures and any other patentable subject matter.

§ 4.1 Exemplary Architecture

Figure 1:
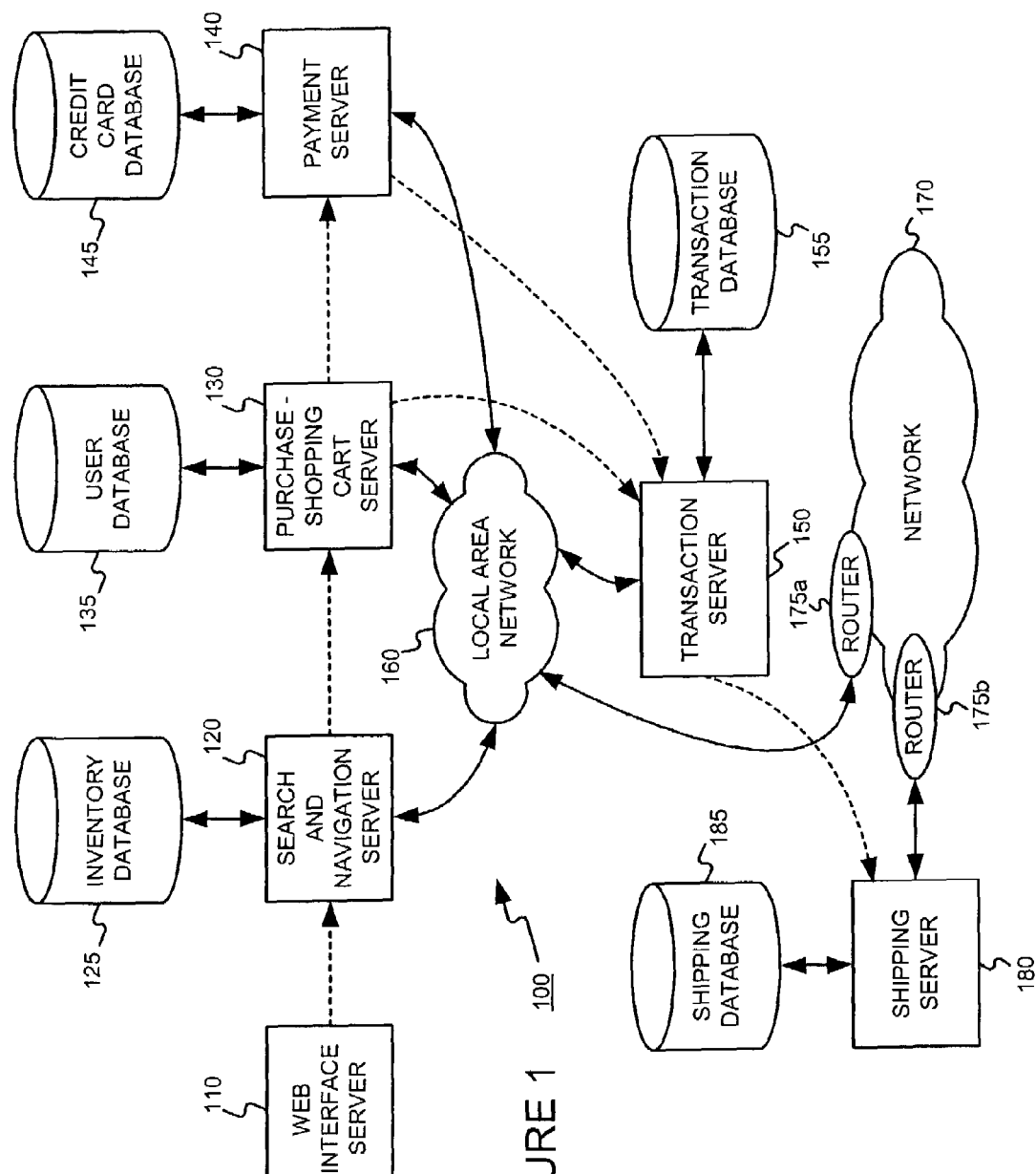
FIG. 1 is a diagram of a e-commerce system to which the present invention may be applied to monitor faults and performance.
Figure 2:
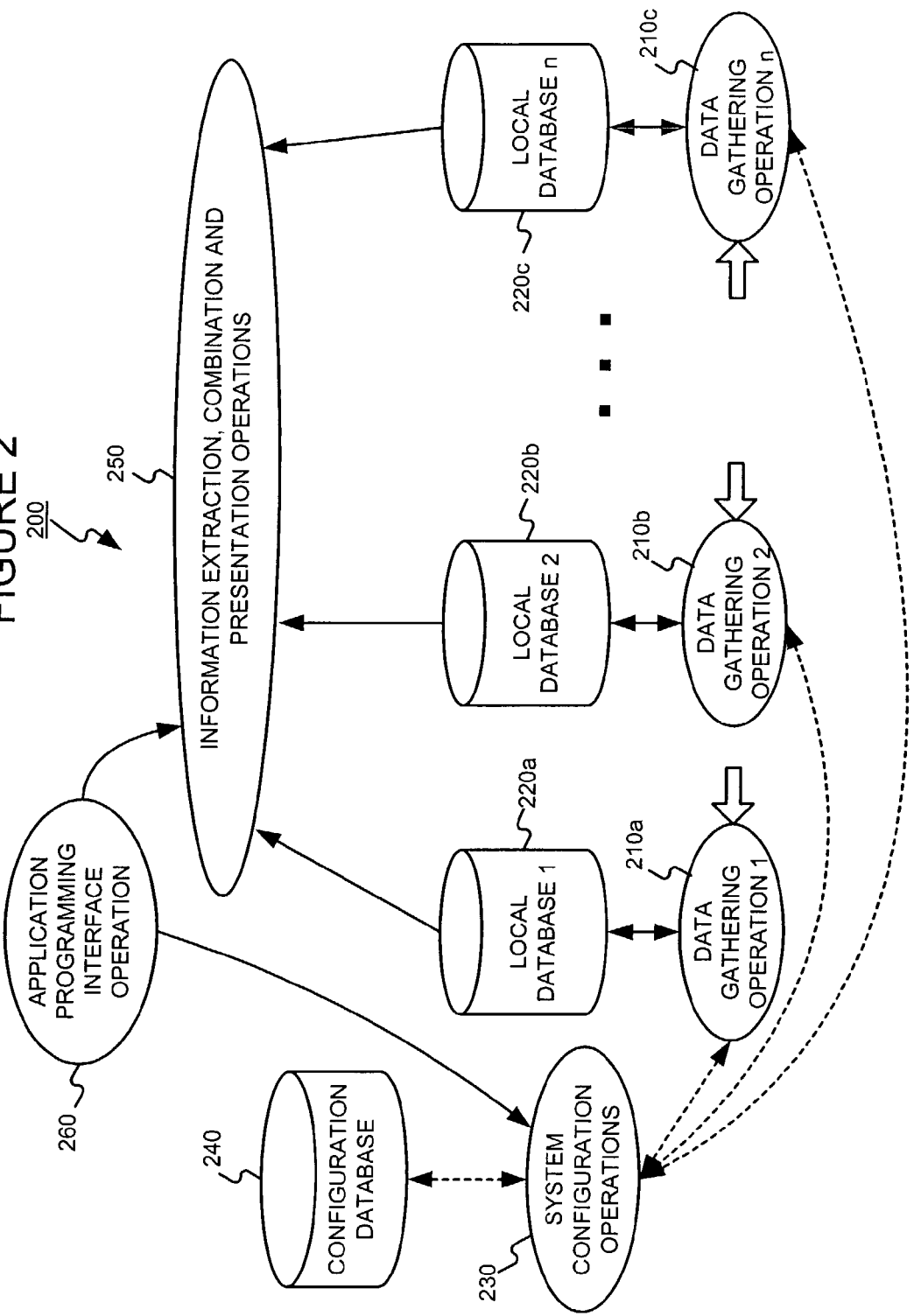
FIG. 2 is a bubble chart illustrating an architecture of the present invention.

FIG. 2 is a bubble chart of an exemplary system fault and performance monitoring architecture 200 which employs distributed data gathering and storage. This distributed architecture enables the system to handle the large volume of data collected for performance monitoring. It also enables real-time performance monitoring. More specifically, a number of data gathering operations 210 (also referred to as "data gathering elements" or "DGEs") are distributed across a number of facilities or components of a system (not shown). For example, referring back to the exemplary system 100 of FIG. 1, a first DGE may be provided on the local area network 160, a second DGE may be provided on the network 170, and a third DGE may be provided on the shipping server 180. As indicated by the arrows, DGEs can collect traps and messages and can receive data from an external feed. As described in more detail in § 4.2 below, DGEs can perform further tasks. Data gathered and/or generated by each DGE 210 is stored in an associated database 220.

DGEs 210 can be configured using system configuration operations 230, in accordance with a configuration database 240. Basically, the system configuration operations 230 can (i) allow configuration information to be entered into the configuration database 240, (ii) inform each DGE of its startup configuration 210, and (iii) inform each DGE 210 of runtime changes to its configuration.

Information extraction, combination and presentation operations 250 may collect fault information from the DGEs 210 (either by asking a proxy process or directly via their databases 220), may collect performance information from the databases 220 of the DGEs 210, may combine fault and performance information from different DGEs, and may present fault and performance information to a user in a unified, integrated manner. The presentation of this information may be in the form of screens, graphs, reports, etc.

Finally, an application programming interface ("API") operation 260 may be provided to permit users to expand the fault and performance monitoring functionality of the present invention. In one embodiment consistent with the principles of the present invention, the API permits provisioning accounts, users, devices, tests, actions, DGE locations, and DGE hosts through a socket interface. Such an embodiment enables mass data entry, updates and searches. Searches for test results and events are also permitted via this interface. A limited number of reports are available, although a full complement of reporting is offered via a graphical user interface ("GUI"). In a particular embodiment of the present invention, a perl API is provided which uses the underlying socket interface. Organizations with large numbers of monitored devices can provision, update or search systems using the API.

In one embodiment of the invention, the system configuration operations 230, the configuration database 240, the information extraction, combination and presentation operations 250, and the API operations 260 may all be performed from and provided at the same facility or server. The information extraction, combination and presentation operations may be referred to as a "business visibility engine" or "BVE". A "BVE" may also include the configuration operations 230, the configuration database 240, and the API operations 260.

Recall that although some traditional NMS products have distributed collectors, they require consolidating all the data into a central database for reporting. Thus the architecture 200 of FIG. 2 is much different in that the information extraction, combination and presentation operations 250 seamlessly integrates distributed DGE databases 220 and can issue queries in parallel across the distributed DGEs 210. The responses from such queries can then be combined (also referred to as response "correlation"). The n-tier architecture 200 is centered on a configuration database management system. The distributed nature of the system 200 permits committing explicit resources to important processes and systems, hence achieving real-time scalability and performance. Typical traffic flow across an n-tier system consists of a number of clients that access services from one tier, which in turn requests services from one or more systems.

This architecture pushes even the correlation and notification to the distributed DGEs so that there is no central bottleneck and the system operates as a loosely coupled but coordinated cluster. One embodiment, consistent with the principles of the present invention, uses key technology standards such as XML, JMS, JDBC, SOAP and XSLT layered on a J2EE framework.

§ 4.2 Environment in which the Present Invention May Operate

Figure 3:
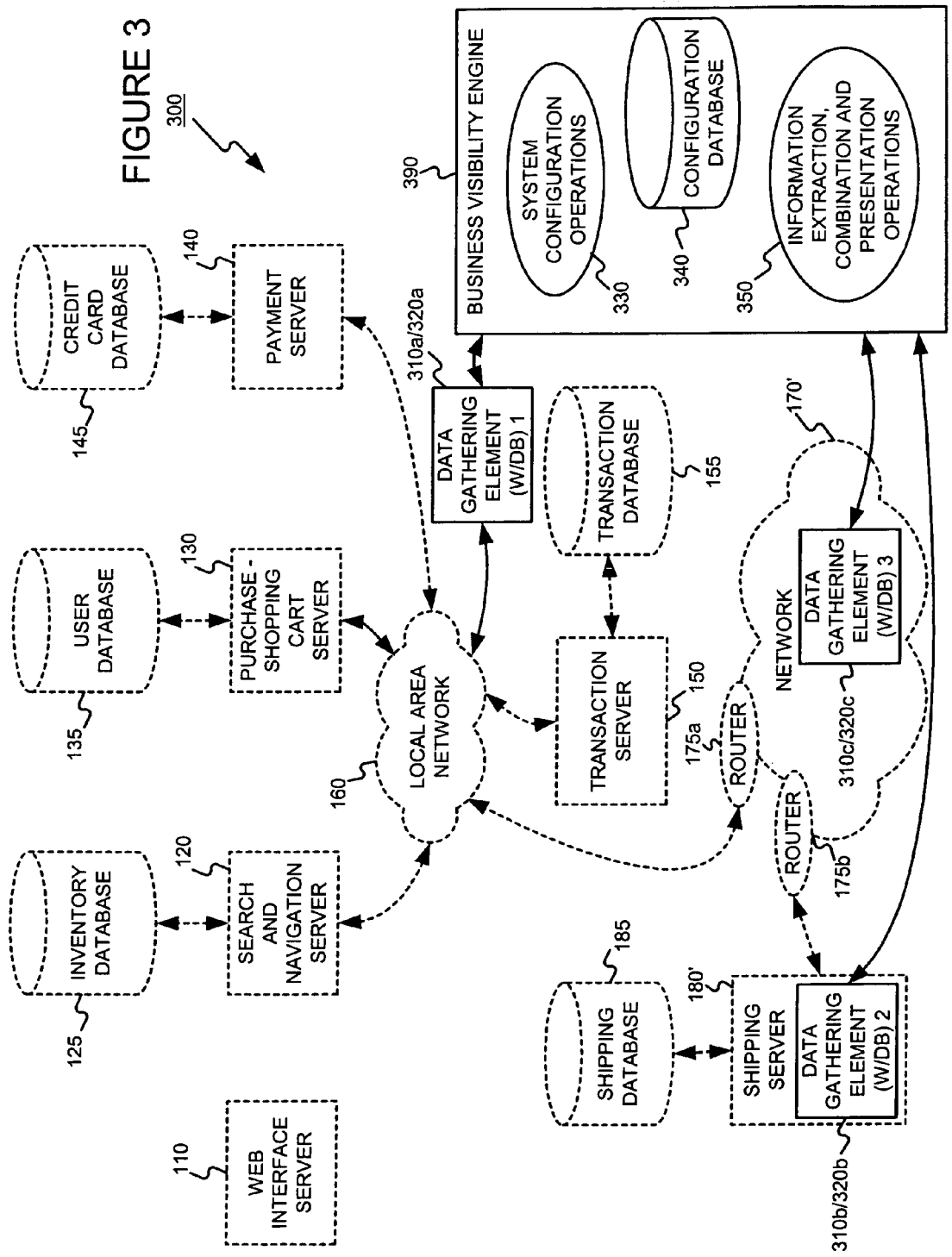
FIG. 3 is a diagram illustrating an exemplary application of the present invention to the e-commerce system of claim 1.

FIG. 3 illustrates an exemplary system 300 in which the fault and performance monitoring architecture of FIG. 2 has been applied to the exemplary e-commerce system 100 of FIG. 1. The components of the exemplary e-commerce system 100 are depicted with dashed lines. As shown, a first data gathering element (and an associated database) 310a/320a is provided on the LAN 160, a second data gathering element (and an associated database) 310b/320b is provided on the shipping server 180', and a third data gathering element (and an associated database) 310c/320c is provided on the network 170'. These elements may be configured by, and may provide information to, a business visibility engine 390. The business visibility engine 390 may include system configuration operations 330, a configuration database 340, information extraction, combination and presentation operations 350 and API operations 360.

§ 4.3 Exemplary Methods, Apparatus and Data Structures

Exemplary methods, apparatus, and data structures that may be used to effect the configuration, data gathering, and information extraction, combination and presentation operations are now described.

§ 4.3.1 Configuration

Figure 4:
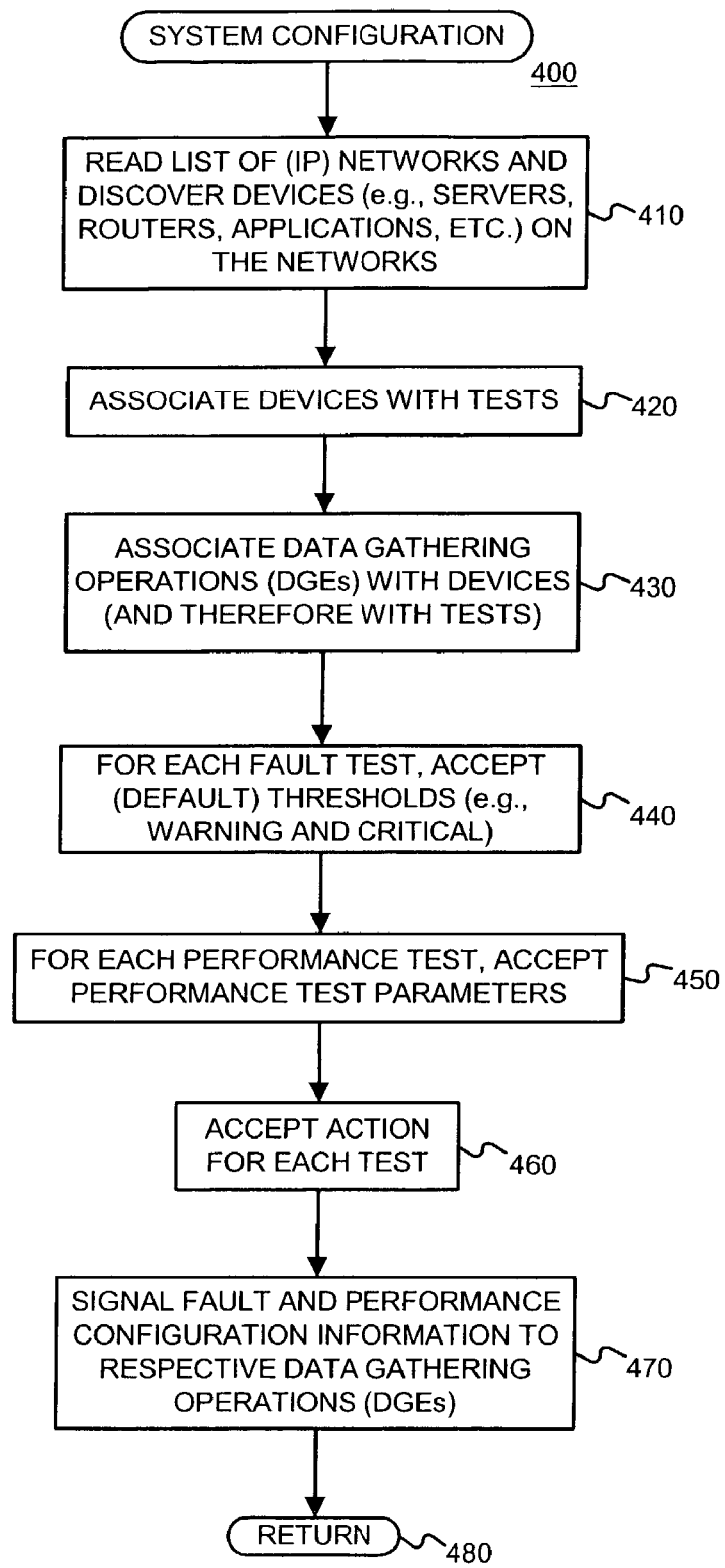
FIG. 4 is a flow diagram of an exemplary method that may be used to perform system configuration operations in a manner consistent with the principles of the present invention.
Figure 7:
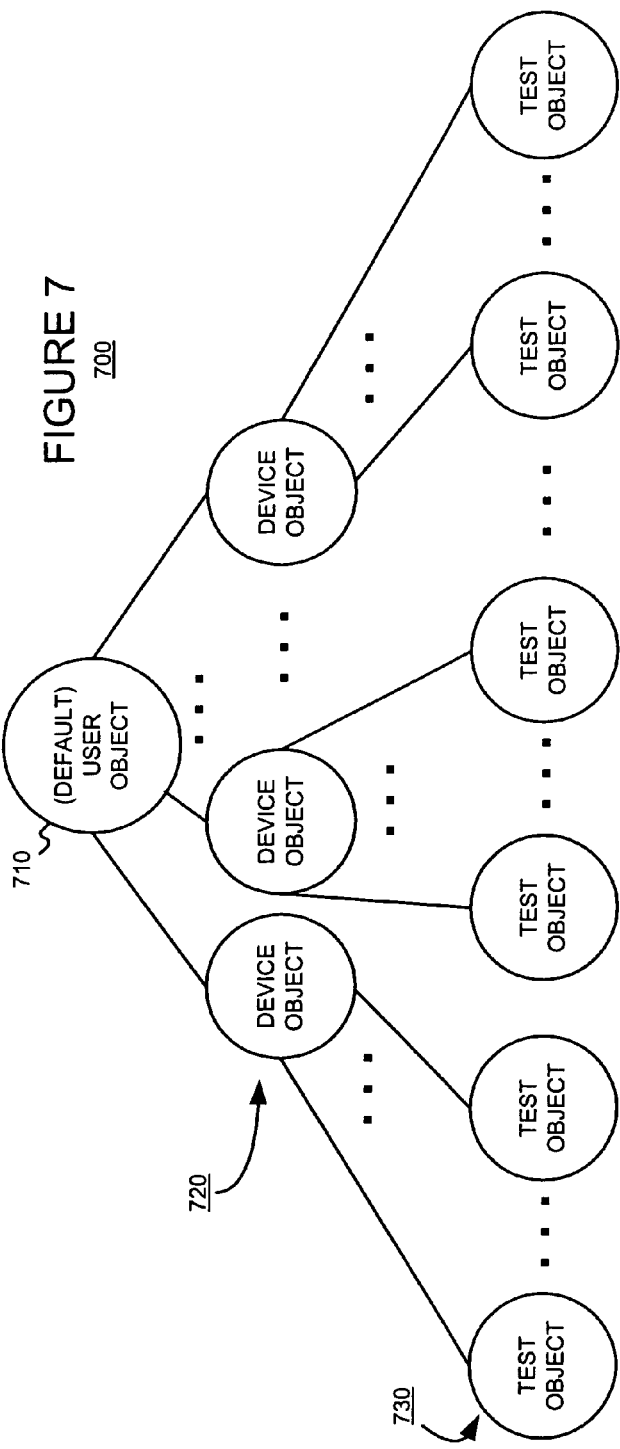
FIGS. 7–10 are exemplary object-oriented data structures that may be used to store configuration information in a manner consistent with the principles of the present invention.

System configuration may include information learned or discovered from the system and/or information entered via the API operation. FIG. 4 is a flow diagram of an exemplary method 400 that may be used to generate system configuration information. As indicated by block 410, a list of (e.g., Internet Protocol) networks can be read and this list can be used to discover devices (e.g., servers, routers, applications, etc.) on those networks. Alternatively, this information may be manually entered or otherwise defined (e.g., via the API operation). Each of the devices is associated with one or more fault and/or performance tests as indicated by block 420. This association may be established via an auto-discovery mechanism. Alternatively, this association may be manually entered or otherwise defined (e.g., via the API operation). As shown in the exemplary data structure 700 of FIG. 7, each of a number of device objects 720 may include one or more test objects 730.

Figure 10:
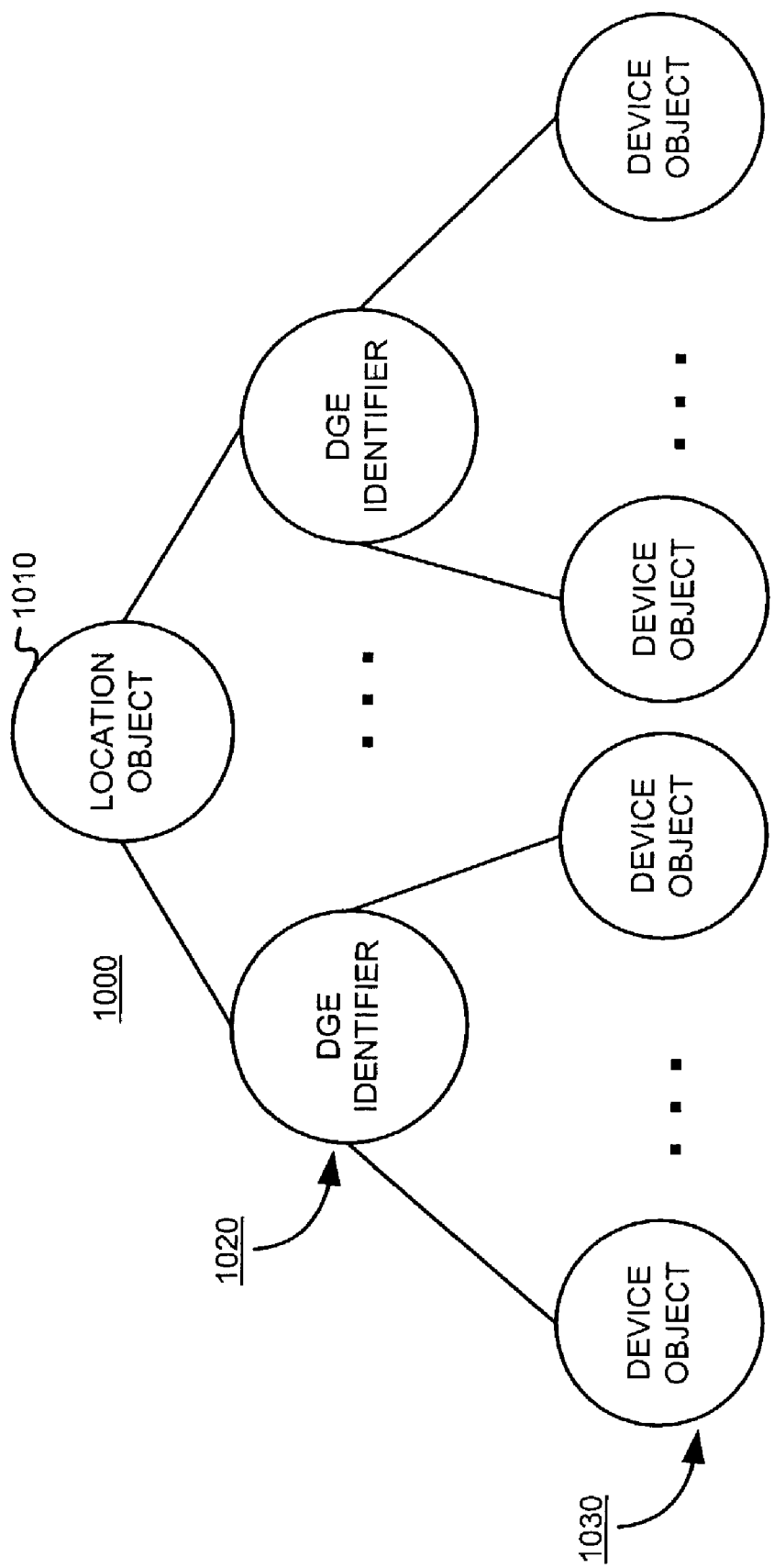

Further, each of at least one data gathering operation (e.g., a DGE) is associated one or more of the devices as indicated by block 430. This association may be manually entered or otherwise defined (e.g., via the API operation), but is preferably discovered. In one embodiment, a DGE at a particular location is associated with devices at the same location. In this embodiment, when additional DGEs are added to a location, the load of monitoring the devices at that location may be balanced across the DGEs at that location. As shown in the exemplary data structure 1000 of FIG. 10, a location 1010 may include one or more DGEs 1020. Each of the DGEs 1020 may be associated with one or more device objects 1030.

As indicated by block 440, thresholds are associated with the tests. The thresholds may be default thresholds, or may be provided, for example via the API operation, on a case-by-case basis. Exemplary thresholds, for example, may include a "warning" threshold and a "critical" threshold. As just alluded to, the test may, by definition, include (default) thresholds. Similarly, as indicated by block 450, performance test parameters may be associated with at least some of the tests. The parameters may be default parameters, or may be provided, for example via the API operation, on a case-by-case basis.

Figure 8:
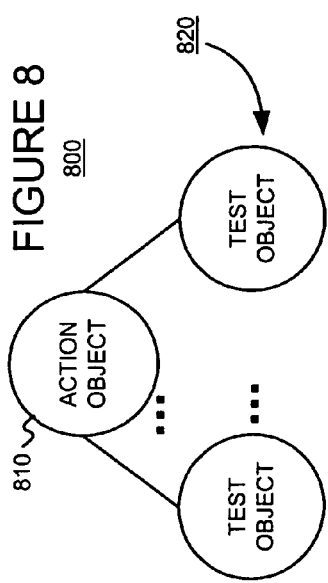

As indicated by block 460, a number of actions may be provided, and one or more tests may be associated with each action. For example, an action may be "e-mail a critical threshold violation to network administrator". A number of fault tests may be associated with this action such that if any of the tests violate a critical threshold, the network administrator is informed. These associations may be entered via the API operation, or may be defined in some other way (e.g., by default). As shown in the exemplary data structure 800 of FIG. 8, an action object 810 may include one or more test objects 820.

The various associations may be stored in the configuration database 240. Although these associations may be stored in an object-oriented database, other data structures may be used to store this information in an alternate database type. However, an object-oriented database allows easy and flexible schema maintenance as compared to other database types available today.

Referring back to FIG. 4, the fault and performance configuration information may be provided (e.g., signaled) to respective data gathering operations as indicated by block 470. If the respective data gathering operations are already available (e.g., on standby), this signaling may occur immediately. If, on the other hand, the respective data gathering operations are not yet available, this signaling may be done in response to an indication that a new data gathering objection has been added. For example, in such an embodiment, upon startup, a DGE only needs to know its own identifier (as used in the configuration database) and the (IP) address of the server running the configuration database. Further, if there is a failure, a new DGE can be started up with the identifier of the failed DGE, and this new DGE will download its configuration from the configuration database and thus assume the work of the failed DGE. Furthermore, if a connection to the configuration database is lost, or if the configuration database goes down, configured DGEs can continue to function as presently configured until the connection and/or configuration database is restored.

§ 4.3.1.1 Monitors and Plug-Ins

Recall from block 420 that tests may be associated with a device. A "monitor" at a DGE performs a test based on the test object. A "scheduler" at the DGE determines a test type from the test object and then puts it onto a queue for the monitor. Thus, the actual testing is done via a monitor of a DGE.

Although monitors may be predefined, the API operation may allow users to create "plug-ins" to define new tests (e.g., for a new device) to be performed by new monitors. In this regard, monitors are similar to device drivers in an PC operating system. More specifically, a PC operating system has drivers for may popular peripherals. However, device drivers for new peripherals or less popular peripherals may be added. Similarly, as new devices types are added to the system being monitored, new monitors for testing these new device types may be added. The present invention may overprovision a DGE with monitors. In this way, even though some monitors might not be used, as devices are added, the DGE can simply activate a monitor needed to test the newly added device.

A list of at least some exemplary monitors that may be supported by the present invention is provided in § 4.3.1.1.1 below.

§ 4.3.1.1.1 Exemplary Network Monitors

ICMP network monitors may be used to check the reachability of hosts on an Internet Protocol ("IP") network using the ICMP protocol. The ICMP monitor reports on packet loss and latency for a sequence of ICMP packets. These monitors may include:

ICMP Round Trip Time—Average time of 5 packets sent at 1 second intervals of 100 bytes each. Measured in milliseconds.

ICMP Packet Loss—% of packets lost out of 5 packets sent at 1 second intervals of 100 bytes each.

SNMP network monitors for querying devices using the standard SNMP v1, v2 and v3 protocol. Certain enhancements have been made to the monitor such using 64-bit counters where available, account for rollover of 32-bit counters, asynchronous polling to avoid waiting for responses and optimize timeout periods, multiple queries in the same SNMP packet, automatically sending individual queries if the multiple query packet fails for any reason, and querying an alternate SNMP port. In an exemplary embodiment, a external definition library has been built which defines which SNMP variables and post processing (such as rate, delta, etc.) needs to be queried based on the device type. This permits easily updating the definition library without having to edit the core product resources (SNMP v1, v2, v3) may use 64-bit counters where available, and may also account for rollover of 32-bit counters. Multiple SNMP queries to the same host may be sent in the same packet for optimization. An alternate SNMP port may be queried instead of default. These monitors may include:

Bandwidth Utilization by Interface—% of total network bandwidth, both incoming and outgoing, calculated by the delta bytes between each sample.

Throughput by Interface—number of packets per second.

Interface Errors—CRC error rate (per minute) calculated by the delta between sample intervals.

BGP Monitor—BGP peer state (connected or failed), route flaps (rate of routing updates).

Environment—Cisco, Foundry chassis temperature, fan status, power supply.

SNMP Traps—Customizable trap handler which assigns a severity to received traps based on a customizable configuration file and inserts into the system.

SNMP Host Resources (SNMP v1, v2, v3) monitors may include:

CPU load—Average % per minute.

Disk space—% of total disk available for each partition; does not show total size.

Physical Memory—% of physical memory used.

Virtual Memory—% of virtual memory used.

Paging/Memory Swapping—number of page swaps per unit time.

Printer MIB support—printer health, paper tray capacity, cover status, available storage.

TCP Port monitors for monitoring the transaction of well known Internet services such as HTTP, HTTPS, FTP, POP3, IMAP, IMAPS, SMTP, NNTP.

Exemplary port monitors may include:

HTTP—Hypertext Transport Protocol—Monitors the availability and response time of HTTP Web servers. Checks for error response.

HTTPS—HTTP Secure Socket Layer—This monitor supports all of the features of the HTTP monitor, but also supports SSL encapsulation, in which case the communication is encrypted using SSLv2/SSLv3 protocols for increased security. The monitor may establish the SSL session and then perform HTTP tests to ensure service availability.

SMTP—Simple Mail Transport Protocol—Monitors the availability and response time of any mail transport application that supports the SMTP protocol (e.g., Microsoft Exchange, Sendmail, Netscape Mail.)

POP3—Post Office Protocol (E-mail)—Monitors the availability and response time of POP3 email services. If legitimate username and password is supplied, it may login and validate server response.

Generic Port—Any TCP port can be monitored for a response string.

IMAP4—Internet Message Access Protocol—Monitors the availability and response time of IMAP4 email services. If legitimate username and password is supplied, it may login and validate server response.

IMAPS—IMAP Secure Socket Layer—This monitor may support all of the features of the IMAP monitor, but may also support SSL encapsulation, in which case the communication is encrypted using SSLv2/SSLv3 protocols for increased security. The monitor may establish the SSL session and then perform IMAP tests to ensure service availability.

FTP—File Transport Protocol—Monitors the availability and response time of FTP port connection. It may send a connection request, receive OK response and then disconnect. If legitimate username and password is supplied, it may login and validate server response.

NNTP—Connects to the NNTP service to check whether or not Internet newsgroups are available, receives OK response and then disconnects. Note that for POP, FTP & IMAP monitors, if the user does not specify a username or password, then just a port connection is deemed OK. If the user specifies a username/password combo, then an actual LOGIN is considered OK, else fail.

§ 4.3.1.1.1.1 More Network Monitors

The Simple Network Management Protocol ("SNMP") is a popular protocol for network management. SNMP facilitates communication between a managed device (i.e., a device with an SNMP agent, such as a router for example) and an SNMP manager or management application (represents a user of network management). The SNMP agent on the managed device provides access to data (managed objects) stored in the managed device. The SNMP manager or management application uses this access to monitor and control the managed device.

Communication between the managed device and the management operation is via SNMP Protocol Data Units ("PDUs") that are typically encapsulated in UDP packets. Basically, four kinds of operations are permitted between managers and agents (managed device). The manager can perform a GET (or read) to obtain information from the agent about an attribute of a managed object. The manager can perform a GET-NEXT to do the same for the next object in the tree of objects in the managed device. The manager can perform a SET (or write) to set the value of an attribute of a managed object. Finally, the agent can send a TRAP, or asynchronous notification, to the manager telling it about some event in the managed device.

SNMP agents for different types of devices provide access to objects that are specific to the type of device. To enable the SNMP manager or management application to operate intelligently on the data available in the device, the manager needs to know the names and types of objects in the managed device. This is made possible by Management Information Base ("MIB") modules, which are specified in MIB files usually provided with managed devices. (See, e.g., the publication Request for Comments 1213, the Internet Engineering Task Force (incorporated herein by reference).)

One embodiment of the present invention may support at least some of the following SNMP MIBs:

RFC1253—OSPF Version 2
  OSPF {neighbor} Status
  OSPF {neighbor} Errors
  OSPF External LSA
  OSPF LSA Sent/Received RFC1514—Host Resources MIB
  Disk Space Utilization
  Physical Memory Utilization
  Swap/Virtual Memory Utilization
  CPU Load
  Running Application/Process Count
  Logged In User Count RFC1657—Border Gateway Protocol (BGP-4)
  BGP {neighbor} Status
  BGP {neighbor} Updates Sent/Received
  BGP {neighbor} FSM Transitions RFC1697—Relational Database Management
  {rdbms} Status
  {rdbms} Disk Space Utilization
  {rdbms} Transaction Rate
  {rdbms} Disk Reads/Writes
  {rdbms} Page Reads/Writes
  {rdbms} Out Of Space Errors RFC1724—RIP Version 2
  RIP Route Changes
  RIP {interface} Updates Sent
  RIP {neighbor} Bad Routes Received RFC1759—Printer MIB
  Printer Status
  Printer Paper Capacity
  Printer Door Status RFC2115—Frame Relay DTE
  Frame Relay {dlci} Status
  Frame Relay {dlci} FECN/BECN
  Frame Relay {dlci} Discards/DE
  Frame Relay {dlci} Traffic In/Out RFC2863—Interfaces Group MIB
  {interface} Status
  {interface} Utilization In/Out
  {interface} Traffic In/Out
  {interface} Packets In/Out
  {interface} Discards In/Out
  {interface} Errors In/Out.

One embodiment of the present invention may support at least some of the following vendor specific MIBs:

APC UPS
  UPS Battery Status
  UPS Battery Capacity
  UPS Battery Temperature
  UPS Voltage
  UPS Output Status Checkpoint FW-1
  Packets Accepted
  Packets Rejected
  Packets Dropped
  Packets Logged
  CPU Utilization Cisco 340/350 Wireless Access Points
  Associated Stations
  Neighbor Access Point Count Cisco Local Director
  Virtual {server}:{port} status
  Virtual {server}:{port} Connections
  Virtual {server}:{port} Traffic In/Out
  Virtual {server}:{port} Packets In/out
  Real {server}:{port} status
  Real {server}:{port} Connections
  Real {server}:{port} Traffic In/Out
  Real {server}:{port} Packets In/out
  Failover Cable Status Cisco PIX Firewall
  Firewall Status
  Active IP Connections
  Active FTP Connections
  Active HTTP Connections
  Active HTTPS Connections
  Active SMTP Connections
  Active H.323 Connections
  Active NetShow Connections
  Active NFS Connections Cisco Router/Catalyst Switch
  {interface} CRC Errors
  Backplane Utilization
  VLAN Traffic In/Out
  VLAN Error In/Out
  CPU Utilization
  Memory Utilization
  Buffer Allocation Failure
  Chassis Temperature
  Fan Status
  Power Supply Status
  Module Status Compaq Insight Manager
  Network Interface Status
  Network Interface Utilization In/Out
  Network Interface Alignment Error In/Out
  Network Interface FCS Error In/Out
  CPU Utilization
  Disk Space Utilization
  RAID Controller Status
  RAID Array Chassis Temperature
  RAID Array Fan Status
  RAID Array Power Supply Status Foundry Network Router/Switch
  CPU Utilization
  Chassis Temperature Fan Status
Power Supply Status HP/UX
Disk Space Utilization
Physical Memory Utilization
Swap/Virtual Memory Utilization
CPU Load
Running Application/Process Count
Logged In User Count LAN Manager (Windows Only)
Windows Login Errors
System Errors
Workstation I/O Response
Active Connections Microsoft DHCP Server
Available Address In Scope
DISCOVER Request Received
REQUEST Request Received
RELEASE Request Received
OFFER Response Sent"
ACK Request Received
NACK Request Received Microsoft Exchange Server
Exchange Server Traffic In/Out
Exchange Server ExDS Access Violations
Exchange Server ExDS Reads
Exchange Server ExDS Writes
Exchange Server ExDS Connections
Exchange Server Address Book Connections
Exchange Server LDAP Queries
Exchange Server MTS
Exchange Server SMTP Connections
Exchange Server Failed Connections
Exchange Server Queue
Exchange Server Delivered Mails
Exchange Server Looped Mails
Exchange Server Active Users
Exchange Server Active Connections
Exchange Server Xfer Via IMAP
Exchange Server Xfer Via POP3
Exchange Server Thread Pool Usage
Exchange Server Disk Operation (delete)
Exchange Server Disk Operation (sync)
Exchange Server Disk Operation (open)
Exchange Server Disk Operation (read)
Exchange Server Disk Operation (write)

Microsoft Internet Information Server (IIS)
Incoming/Outgoing Traffic
Files Sent/Received
Active Anonymous Users
Active Authenticated Users
Active Connections
GET Requests
POST Requests
HEAD Requests
PUT Requests
CGI Requests
Throttled Requests
Rejected Requests
Not Found (404) Errors Microsoft SQL Server (Using Network Harmoni ACM)
{database} Status
{database} Page Reads/Writes
{database} TDS Packets
{database} Network Errors
{database} CPU Utilization
{database} Threads
{database} Page Faults
{database} Users Connected
{database} Lock Timeouts
{database} Deadlocks
{database} Cache Hit Ratio
{database} Disk Space Utilization
{database} Transaction Rate
{database} Log Space Utilization
{database} Replication Rate Oracle 8/9i Database □.Oracle DB {database} Status
Oracle DB {database} Disk Utilization
Oracle DB {database} Transaction Rate
Oracle DB {database} Disk Reads/Writes
Oracle DB {database} Page Reads/Writes
Oracle DB {database} OutOfSpace Errors
Oracle DB {database} Query Rate
Oracle DB {database} Committed/Aborted Transactions
Oracle Table {table} Space Utilization
Oracle Table {table} Status
Oracle Datafile {file} Reads
Oracle Datafile {file} Writes
Oracle Replication Status
Oracle Listener Status
Oracle SID Connections Sun Solaris
System Interrupts
Swap In/Out to Disk
CPU Load NET-SNMP (formerly UCD-SNMP) □.Disk Space Utilization
Physical Memory Utilization
Swap/Virtual Memory Utilization
CPU Load
System Interrupts
Swap In/Out to Disk
Block I/O Sent/Received
System Load Average.

One embodiment of the present invention may support at least some of the following non-SNMP tests:

Networking
Ping Packet Loss
Ping Round Trip Time
RPC Ping

Internet Services
HTTP
HTTPS
SMTP
IMAP
IMAPS
POP3
POP3S
NNTP
FTP

Applications
Radius
NTP
DNS Domain
SQL Query
LDAP Search
DHCP Request
URL/Web Transaction Test Custom
  External Data Feed
  External Plug in Monitors
  Advanced Port Test
  Advanced SNMP Test.

§ 4.3.1.1.2 Exemplary Application Monitors

Exemplary application monitors may include:

URL transaction monitor—Measures time to complete an entire multi-step URL transaction. Can fill forms, clicks on hyperlinks, etc. May work with proxy and also support https.

Oracle system performance—Measures RDBMS size, RDBMS transaction rate, and table size.

SQL database query—measures query response time for a SQL query from databases such as Oracle, Sybase, SQL Server, Postgres, MySQL. Required inputs may include legitimate username, password, database driver selection, database name, and proper SQL query syntax. May support Oracle, Sybase, SQL Server, Postgres, MySQL.

Poet OQL database query—Measures query response time. Required inputs may include legitimate username, password, database name, and proper OQL query syntax.

LDAP database query—Connects to any directory service supporting an LDAP interface and checks whether the directory service is available within response bounds and provides the correct lookup to a known entity. Required inputs may include base, scope and filter.

NTP—Monitors time synchronization service running on NTP servers.

RADIUS—Remote Authentication Dial-In User Service (RFC 2138 and 2139)—Performs a complete authentication test against a RADIUS service.

DNS—Domain Name Service (RFC 1035)—Uses the DNS service to look up the IP addresses of one or more hosts. It monitors the availability of the service by recording the response times and the results of each request.

DHCP Monitor—Checks if DHCP service on a host is available, whether it has IP addresses available for lease and how long it takes to answer a lease request.

RPC Portmapper—Checks if the RPC portmapper is running on a Unix host (a better alternative to icmp ping for an availability test).

BEA Weblogic—Checks heap size and transaction rate.

SQL Server—Checks state, transaction rate, write operations performance, cache hit rate, buffers, concurrent users, available database and log space.

LAN Manager—Checks authentication failures, system errors, I/O performance, and concurrent sessions.

§ 4.3.1.1.3 External Data Feed Monitors

External data feeds ("EDF") monitors may be used to insert result values into the system using a socket interface. The inserted data is treated just as if it were collected using internal monitors.

§ 4.3.1.1.4 Plug-In Monitors

The present invention can provide a plug-in monitor framework so that a user can write a custom monitor in Java or any other external script or program. The monitor itself and a definition file in XML are put into a plugin directory, and treated as integrated parts of the DGE itself.

§ 4.3.1.2 Monitoring Business Services (End-to-End)

Since IT infrastructure is typically used to deliver business services within an enterprise, it is increasingly important to correlate the different IT components of a business service. As an example, a payroll service may consist of a payroll application on one server, a backend database on another server, and a printer, all connected by a network router. Any of these underlying IT components can fail and cause the payroll service to go down.

Service views and reports can be created in the exemplary product by grouping together all the underlying components of a service into a consolidated service view. If and when any of the underlying IT components fails, the entire service is reported as down, thus allowing one to measure the impact of underlying IT components on business services.

§ 4.3.1.3 Test Provisioning

Most of the test discovery on a device is done by a separate task. Note that any adds/changes are made to the configuration database which essentially controls the behavior of the DGE processes as described earlier.

Tests can be provisioned using one or more of the following techniques.

Automated Test Discovery

Port and SNMP tests can be automatically "discovered" by querying the device to see what services are running. The system can automatically detect disk partitions, volumes and their sizes so that the usage is normalized as a percentage. This normalization may also be done for memory, disk partitions, and database tablespace.

Auto-Discovery of Vendor, Model, OS

When the auto-discovery for SNMP occurs, the target device database record may be updated with vendor and model information. If a user has checked the SNMP tests box when creating a device, the model and vendor information may be displayed on a configure tests page.

Auto-Update for Device Capacity Change

The present invention can provide a mechanism for refreshing maximum values or SNMP object identifiers (SNMP OID) when an SNMP test has changed. For example, when memory or disk capacity has changed, tests that return percentage-based values would be incorrect unless the maximum value (for determining 100%) is refreshed. Similarly, in the case of a device rebuild, it is possible that the SNMP OIDs may change, thus creating a mismatch between the current SNMP OIDs and the ones discovered during initial provisioning. If any of these situations occurs, the user need only repeat the test provisioning process in the web application for a changed device. The present invention can discover whether any material changes on the device have occurred and highlight those changes on the configure tests page, giving the user the option to also change thresholds and/or actions that apply to the test.

Centralized Administration of Thresholds and Notifications

Default warning and critical thresholds may be set globally for each type of test. Tests can be overridden at the individual device level, or reset for a set of tests in a department or other group. In addition, a service level (SLA) threshold can be set separately to track levels of service or system utilization, which will not provide alarms or actions.

At this point, the system is configured. Data gathering and storage (in accordance with the configuration) is described in § 4.3.2 below. Then, information extraction, combination and presentation (in accordance with the configuration) is described in § 4.3.3 below.

§ 4.3.2 Data Gathering and Storage

To reiterate, under the present invention, data gathering may be performed by distributed data gathering operations (e.g., DGEs). Gathered data may be stored locally by each DGE. Further, DGEs may optionally perform some local data preprocessing such as calculating rate, delta, percentages, etc.

Figure 6:
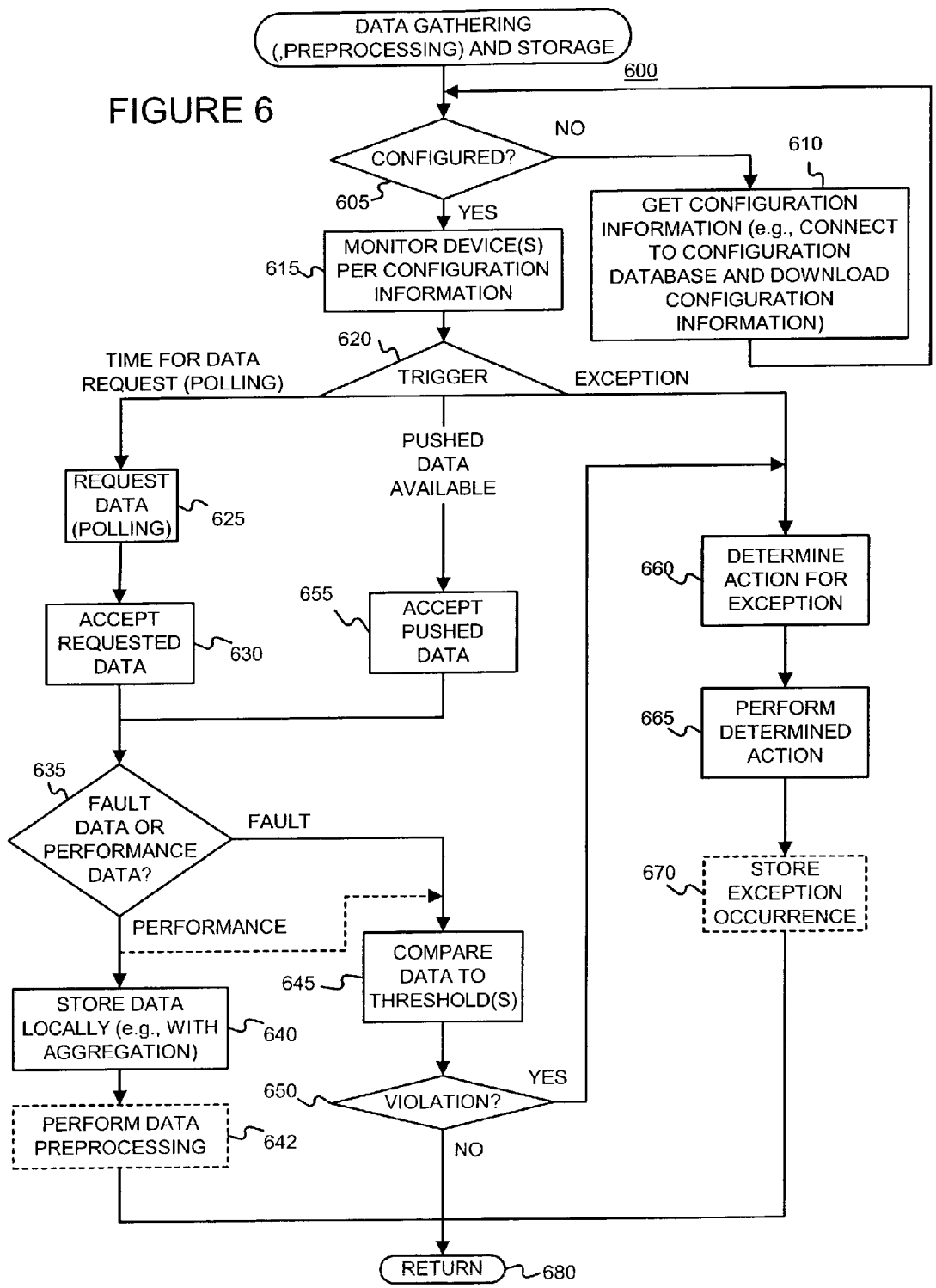
FIG. 6 is a flow diagram of an exemplary method that may be used to perform distributed data gathering, (preprocessing) and storage operations in a manner consistent with the principles of the present invention.

FIG. 6 is a flow diagram of an exemplary method 600 that may be used to perform a data gathering operation. Since these operations are distributed, this method 600 may be performed, possibly asynchronously and independently, by multiple autonomous DGEs. As indicated by decision block 605 and block 610, if the DGE is not yet configured, it should try to get such configuration information. For example, it may do so by connecting to the configuration database and downloading any needed configuration information. Referring back to decision block 605, once the DGE is configured, it monitors device(s) in accordance with such configuration information as indicated by block 615. Recall each DGE may test devices using "monitors" at scheduled intervals specified in each test object.

The remainder of the method 600 may depend on whether the DGE gathers data using a "pull model" (i.e., with distinct requests) or whether it gathers data using a "push model" (i.e., without a distinct request). In either model, the DGE can receive an exception indication if a device performs a self-test and finds an error. Such errors are typically reported using SNMP traps or via a log message. For purposes of simplicity, the various ways of gathering data are shown together. However, a particular implementation of the present invention need not use all of these alternative data gathering techniques.

Referring to trigger (event) block 620, if it is time for the DGE to get data for a particular test (e.g., as specified by a polling scheduler in the DGE), it requests (polls for) data as indicated by block 625 and the requested data is accepted as indicated by block 630. Since these blocks "pull" data from devices, they effect a pull data gathering technique. The period at which data for a particular test is requested may be defined by the test (object) and/or configuration data associated with the test. The request may be placed in a queue. The method 600 then proceeds to decision block 635, described later.

Referring back to trigger (event) block 620, if data is made available (e.g., "pushed") to the DGE, it accepts the data as indicated by block 655, before the method 600 proceeds to decision block 635. Since this branch accepts data that has been "pushed" to the DGE from a device, it effects a push data gathering technique.

Referring now to decision block 635, it is determined whether the data is fault data or performance data. If the data is performance data, it is stored locally as indicated by block 640, before the method 600 is left via return node 670. In one embodiment, the stored data is aggregated (e.g., daily data is combined to weekly data, weekly data is combined to quarterly data, quarterly data is combined to annual data, etc.). As shown by optional block 642, the performance data may be pre-processed. For example, the DGE can pre-process the performance data to calculate rates, deltas, percentages, etc. It can also normalize the collected data.

Referring back to decision block 635, the data is compared with one or more thresholds as indicated by block 645. Then, as indicated by decision block 650, it is determined whether or not the threshold is violated. (In the following, it will be assumed that the fault data is only checked against one threshold to simplify the description. However, the data can be compared against more than one threshold, such as a "critical" threshold and a "warning" threshold.) If the threshold is not violated, the method 600 is simply left via RETURN node 670. If, on the other hand, the threshold is violated, the method 600 branches to block 660 which starts processing for a fault exception.

Referring back to trigger (event) block 620, notice that the method 600 proceeds to block 660 if a fault exception (e.g., generated by a device self-test) is reported to it. As indicated by blocks 660 and 665, an action for the fault exception is determined (Recall, e.g., data structure 800 of FIG. 8.) and performed. Thus, fault events may be handled by the DGE. As indicated by optional block 670, the occurrence of the fault exception may be stored. Thus, in this embodiment, although fault data is not stored if no threshold violation exists, the data itself, or merely the fault exception, can and should be stored in the event of a fault exception occurrence.

In one embodiment, if a threshold has been crossed, an event is generated and fed into a correlation-processor. This thread looks at a rules engine to determine the root-cause of the problem (e.g., upstream devices, IP stack, etc.) and if a notification or action needs to be taken.

§ 4.3.2.1 Data Storage

In an exemplary embodiment, consistent with the principles of the present invention, all data is stored in a JDBC compliant SQL database such as Oracle or MySQL. Data is collected by the DGEs and stored using JDBC in one of a set of distributed databases which may be local or remote on another server. Such distributed storage minimizes data maintenance requirements and offers parallel processing. All events (a test result that crosses a threshold) may be recorded for historical reporting and archiving. Information may be permanently stored for all events (until expired from database). All messages and alerts that may have been received may be permanently stored by the appropriate DGE (until expired from the database). Raw results data (polled data values) may be progressively aggregated over time. In one embodiment, a default aggregation scheme is five-minute samples for a day, 30-minute averages for a week, one-hour averages for three months and daily averages for a year.

§ 4.3.2.2 Events and Messages

Recall from blocks 650, 660 and 665 that a threshold violation or exception may cause an event to be generated. Each event, as well as each exception or message received by the DGE is assigned a severity. A message is assigned a severity based on a user specified regular expression pattern match.

Based on these severity levels, the visual GUI indicates these severity conditions by unique icons or other means. The following severity states are supported:

OK, WARNING, CRITICAL: Typical alarming occurs when test results cross warning and critical thresholds set by the end-user or administrator, and may display yellow and red icons or bars on the various status pages. Devices and tests in a normal state may display an OK icon or green color bar.

UNKNOWN: A test result returns an "unknown" value when the monitor receives no response from the device for that particular test. Unknown results may display a question mark (?) and may also create events that are graphed on reports.

FAIL: This state occurs when a test result is received, but the value returned is invalid. For example, if a POP3 username or password is incorrect, the device may be reached by the test but the login will fail. Failed tests may be displayed and stored as CRITICAL events and graphed accordingly.

UNREACHABLE: It is desirable to differentiate between when a device is unavailable due to its own error and when it is unreachable due to the unavailability of a gateway device (e.g. router or switch).

SUSPENDED. Although not an alarm per se, suspended devices and tests may be displayed with a unique icon to indicated the state.

Events may be recorded for these state changes in order to track historical activity, or lack thereof. Tests can be 'suppressed' when they are in a known condition, and are hidden from view until the state changes after which the suppressed flag is automatically cleared.

An event may be recorded for a test's very first result and for every time a test result crosses a defined threshold. For example, the very first test result for an ICMP round trip time test falls into the "OK" range. Five minutes later, the same test returns a higher value that falls in the "WARNING" range. Another five minutes passes, the test is run again, and the round trip time decreases and falls back into the "OK" range. For the ten minutes that just past, 3 separate events may have been recorded—one because the test was run for the first time, and two more for crossing the "WARNING" threshold, both up and back.

One time text messages, or SNMP traps, or text alarms may be displayed in a separate 'message' window. All messages should have a severity and device associated with them, and the user can filter the messages displayed and acknowledge them to remove from the messages window. A user can match on a regular expression and assign a severity to a text message, thus triggering actions and notifications similar to events.

§ 4.3.2.3 Actions

Recall that events and exceptions trigger actions. An action may be a notification via email or pager, or any other programmable activity such as opening a trouble ticket or restarting a server. Actions may be configured and assigned to tests in the form of a profile, with each profile preferably containing any number of individual sub-actions. Each of these sub-actions may configured with the following information:

notification type—email, pager or external script;
message recipient—email address;
notify on state—OK, Warning, Critical, Unknown (choose one, several, or all);
delay—choose to notify immediately or after N test cycles;
repeat—if the test stays in the trigger state, either don't repeat notification or repeat it every N tests; and
time of day—the time of day that this sub-action is valid.

Actions may be assigned to tests by reference. They may be assigned en masse to multiple devices, and thus all the test configurations on each device. Updating an action may automatically update all test configurations to which the action was assigned.

Having described data gathering (in accordance with the configuration), information extraction, combination and presentation (in accordance with the configuration) is now described in § 4.3.3 below.

§ 4.3.3 Information Extraction, Combination and Presentation

To reiterate, under the present invention, data collection and storage is distributed across various DGEs which each store data locally or a remote distributed database. Further, at least some data analysis may be distributed across various DGEs, each of which may analyze local data. Thus, a (more) centralized reporting facility is relieved of at least some data storage and analysis responsibilities.

Figure 5:
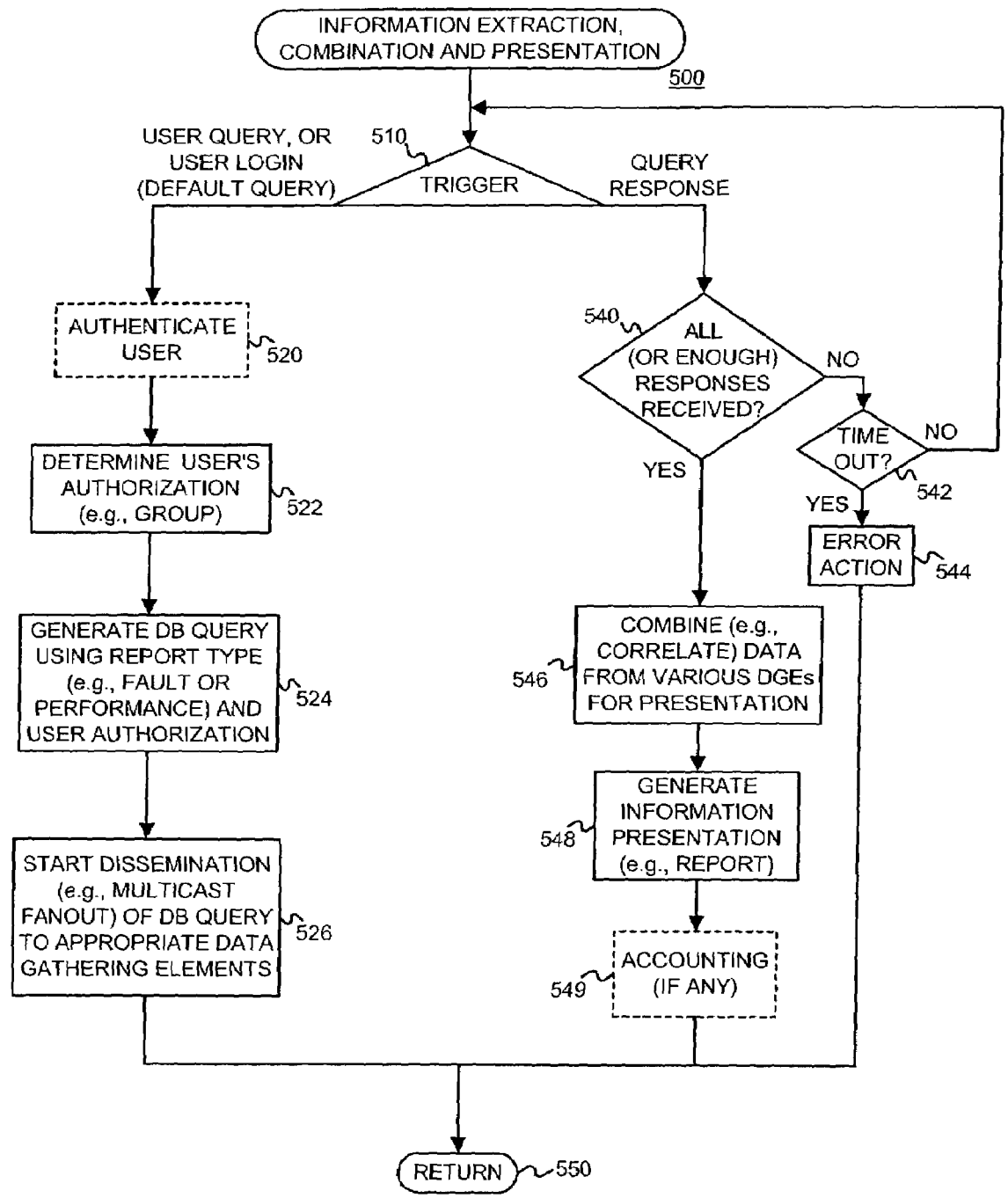
FIG. 5 is a flow diagram of an exemplary method that may be used to perform information extraction, combination and presentation operations in a manner consistent with the principles of the present invention.

FIG. 5 is a flow diagram of an exemplary method 500 that may be used to perform an information extraction, combination and presentation operations. As indicated by trigger (event) block 510, various branches of the method 500 may be effected depending upon the occurrence of a trigger (event).

In response to a user query (Note that a user login may infer a default query.), the user should be authenticated as indicated by block 520. Any known authentication techniques, such as password, radius, or external directory, etc., may be used.

Figure 9:
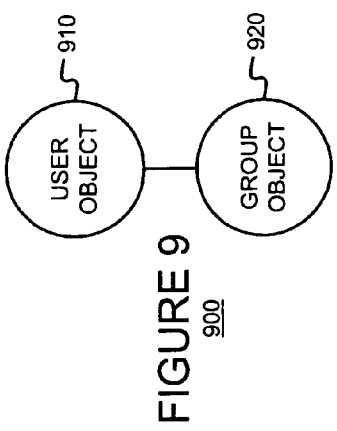

Then, the user's authorization is determined as indicated by block 522. A user's authorization may depend on a group to which the use belongs. (Recall, e.g., data structure 900 of FIG. 9.) An administrator may associate a user to a group using the configuration API. For example, in one exemplary embodiment, a group object may have defined "permissions" (e.g., create actions, create devices, see data of other user, etc.) and defined "limits" (e.g., number of devices, types of devices, device locations, number of tests, etc.). The defined permissions are typically provided for security purposes. The defined limits are typically provided for security purposes and/or for providing flexible software licensing terms.

Referring back to FIG. 5, as indicated by block 524, a database query may be generated using a report type (e.g., fault report or performance report) and the user's authorization. Finally, as indicated by block 526, the dissemination (e.g., multicast or broadcast fan-out) of the database query to appropriate ones of the data gathering elements is started, before the method 500 is left via RETURN node 550. That is, since the fault and performance data is distributed among various data gathering elements, and is not centrally stored, a query is distributed to the appropriate data gathering operations (e.g., DGE databases). Since the configuration information associates users with devices (See, e.g., 710 and 720 of FIG. 7.) and devices with DGEs (See, e.g., 1020 and 1030 of FIG. 10.), the appropriate DGEs can be determined. Alternatively, as alluded to above, the query can be simply broadcast to all DGEs. Non-relevant DGEs can simply not transmit back their data. Alternatively, the data combination act (described later with reference to block 546) could suppress such non-relevant data.

Referring back to trigger (event) block 510, if a query response is received, as indicated by decision block 540, it is determined whether all (or enough) responses have been received. If not, it is determined whether a time out (for receiving enough query responses) has occurred. If, not, the method 500 branches back to trigger (event) block 510. If, on the other hand, a time out has occurred, a time out error action may be taken as indicated by block 544, before the method 500 is left via RETURN node 550. Referring back to decision block 540, if it is determined that all (or enough) responses have been received, the data from the various DGEs is combined (e.g., correlated) for presentation, as indicated by block 546. The correlation is transparent from the user's perspective. Then, as indicated by block 548, a presentation of the information (e.g., a report, a table, a graph, etc.) is generated for rendering to the user. Since the method 500 gets "fresh" data from the distributed databases, real-time performance reporting is possible in addition to real-time fault reporting. Accounting, if any, is performed as indicated by block 549, before the method 500 is left via RETURN node 550.

Although not shown, in one embodiment, the user can "drill-down" into a report to view data or information underlying a presentation result.

§ 4.3.3.1 Reports, Graphs and Tables

Recall from block 548, information is presented back to the user. Such a presentation may be in the form of reports, graphs and tables. Exemplary reports, graphs and tables are now described. Various embodiments of the presented invention may support some or all of the following reports.

Figure 16:
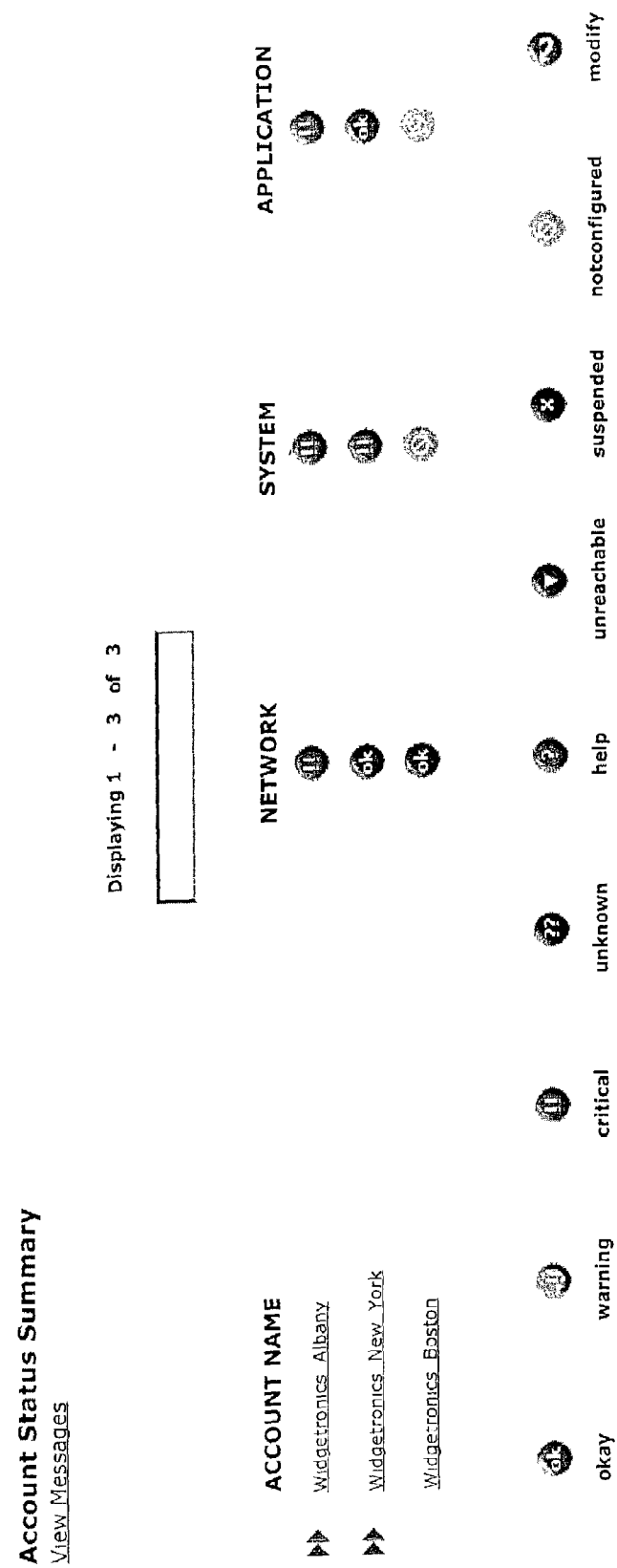
FIG. 16 illustrates an exemplary account status summary report.

An "Availability" report may be based on event data which shows the number of threshold violations, the distribution of such violations and total downtime. This report can be generated for a device, or individual tests or a business service. Device availability may be measured by the ICMP packet loss test. Metrics are captured for the device state equal to CRITICAL or UNREACHABLE. The report shows the top n (e.g., n=10) violations by amount of "unavailability", displaying total time unavailable and % unavailable, with graphics showing either view. Users may link to an availability distribution report/graph for either accounts or devices, depending on which view is being accessed. This histogram is a distribution of the numbers of accounts or devices falling into blocks of 10% availability. That is, itdisplays the number of accounts/devices falling between 0–10% availability, 10–20% availability, and so on. Administrative users can view this report at the account level. FIG. 16 illustrates an exemplary account status summary report. Similarly, FIG. 17 illustrates an exemplary service status summary report. Administrative users can then drill down on individual devices for more detail. End users running the report will only see the device level metrics.

A "Downtime" report is similar to the Availability report, in that it is based on device availability as measured by the ICMP packet loss test. However, the results are only for device states equal to CRITICAL, rather than CRITICAL and UNREACHABLE. This more accurately reflects the situation when a single device outage occurs, with no regard for any possible parent device outages that may cause a child device to become UNREACHABLE. Again, downtime distribution metrics and a histogram permit administrative users to see account level metrics and drill down to individual device details, whereas end users may only see the device level metrics.

Figure 11B:
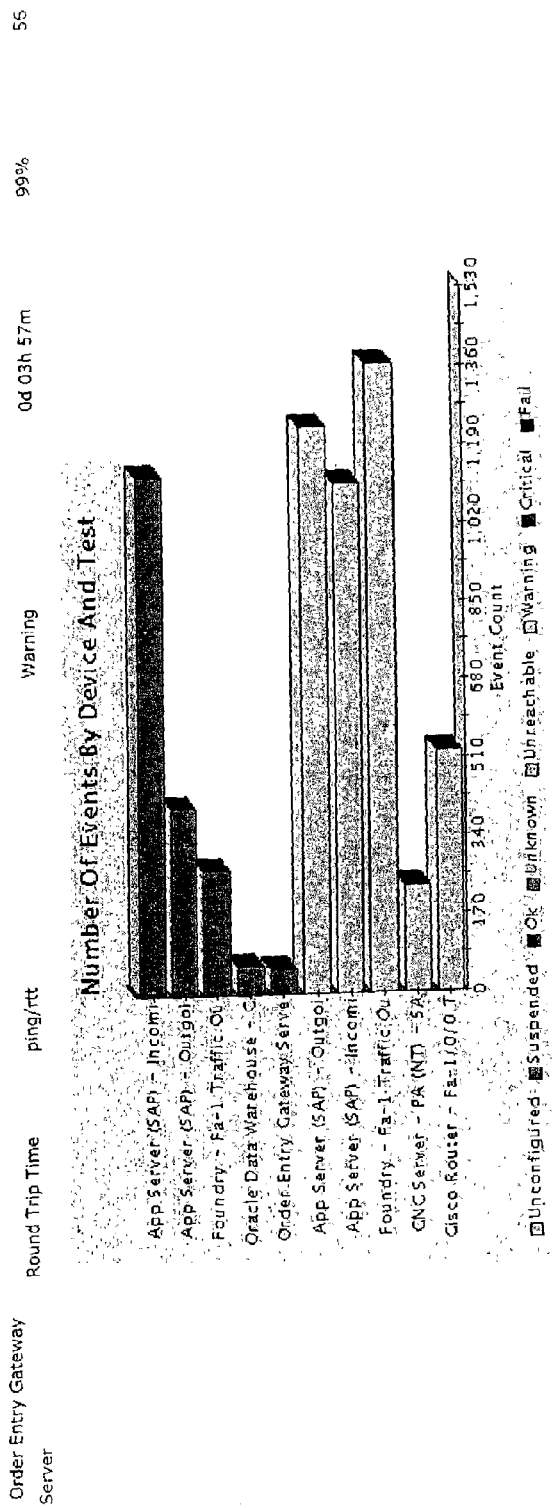

A "Top N" report displays the top N (e.g., N=10) accumulations (based on number of events recorded) during the reporting period per account, per device, and per test. Users may select time frame and event severity. Administrative users can view this report at the account level and then drill down on individual devices and tests for more detail. End users running the report may only see the device and test level metrics. An exemplary "Event" report is illustrated in FIGS. 11A and 11B.

A "Number of Events per Day" report displays the number of events recorded each day during the reporting period per account, per device, and per test. Users may select time frame and event severity. Administrative users can view this report at the account level and then drill down on individual devices and tests for more detail. End users running the report may only see the device and test level metrics.

A "Number of Events" report displays the total number of events recorded during the reporting period per account, per device, and per test. Users may select time frame and event severity. Administrative users can view this report at the account level and then drill down on individual devices and tests for more detail. End users running the report may only see the device and test level metrics.

An "Event Distribution" report displays the total number of events recorded during the reporting period per account, per device, and per test. Users may select time frame and event severity. Administrative users can view this report at the account level and then drill down on individual devices and tests for more detail. End users running the report may only see the device and test level metrics. The histogram is an event duration distribution of the numbers of accounts/devices/tests falling into bins of equal duration for the reporting period. That is, the reporting period may be divided into an equal number of multi-hour (e.g. 4 hour) blocks, with the number of accounts/devices/tests falling into each of those blocks.

A "Device Performance" report snapshot is a period (e.g., 24 hour) snapshot (hour by hour) of event summaries for all tests on a single device. Raw event data is analyzed hourly and the worst test state is displayed for each test as a colored block on the grid (24 hours×list of active tests on the device). For example, if a test is CRITICAL for one minute during the hour, the entire hour may be displayed as a red box representing the CRITICAL state. The Device Performance Report only applies to target devices, not to device groups. An exemplary test status summary report is illustrated in FIG. 12.

Figure 13A:
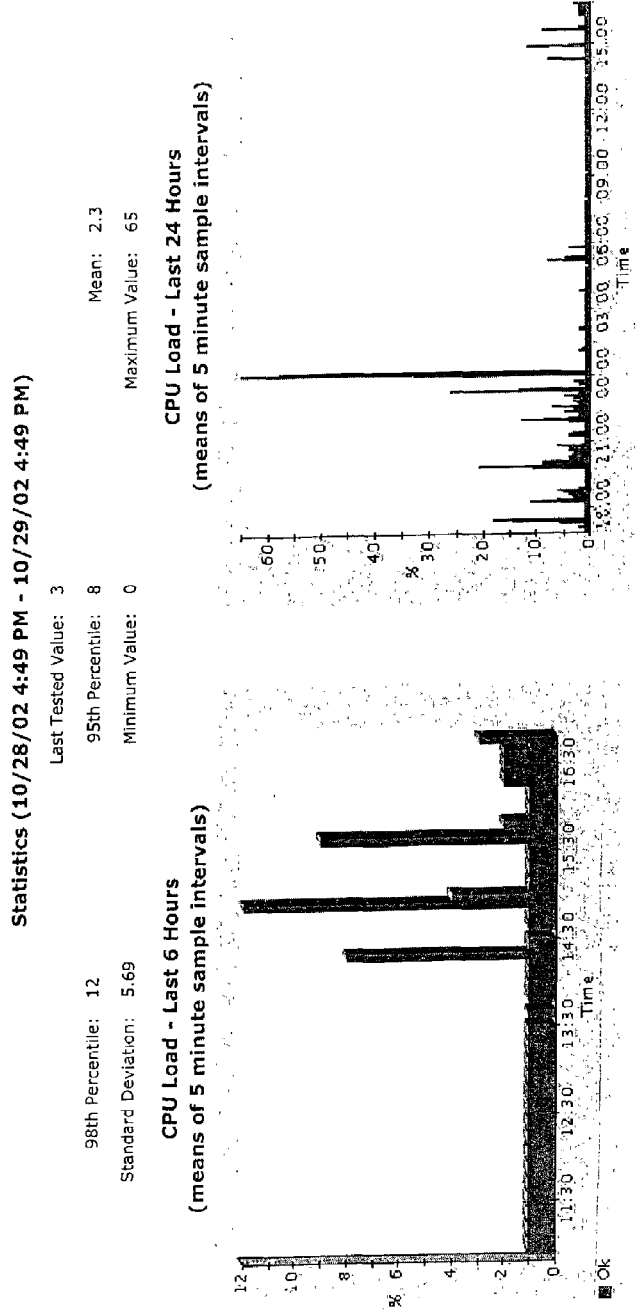
FIGS. 13A and 13B illustrates an exemplary test details report.
Figure 13B:
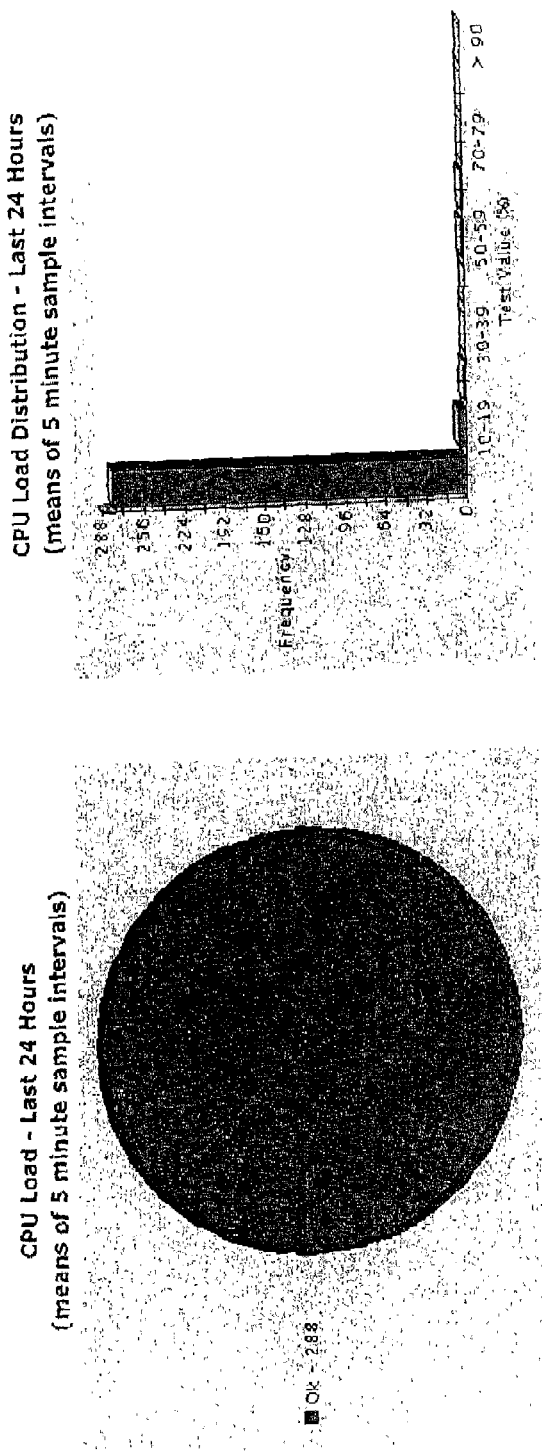

From the "Test Details" pages, users can view the "raw" data, showing all the individual test results for a single test. The difference between the raw data and viewing events is that events only occur when thresholds are crossed, whereas raw data shows the test results for every test interval. An exemplary test details report is illustrated in FIGS. 13A and 13B.

Statistical reports calculate statistics from raw results data such as mean, 95th and 98th percentiles, max and min values.

Figure 14B:
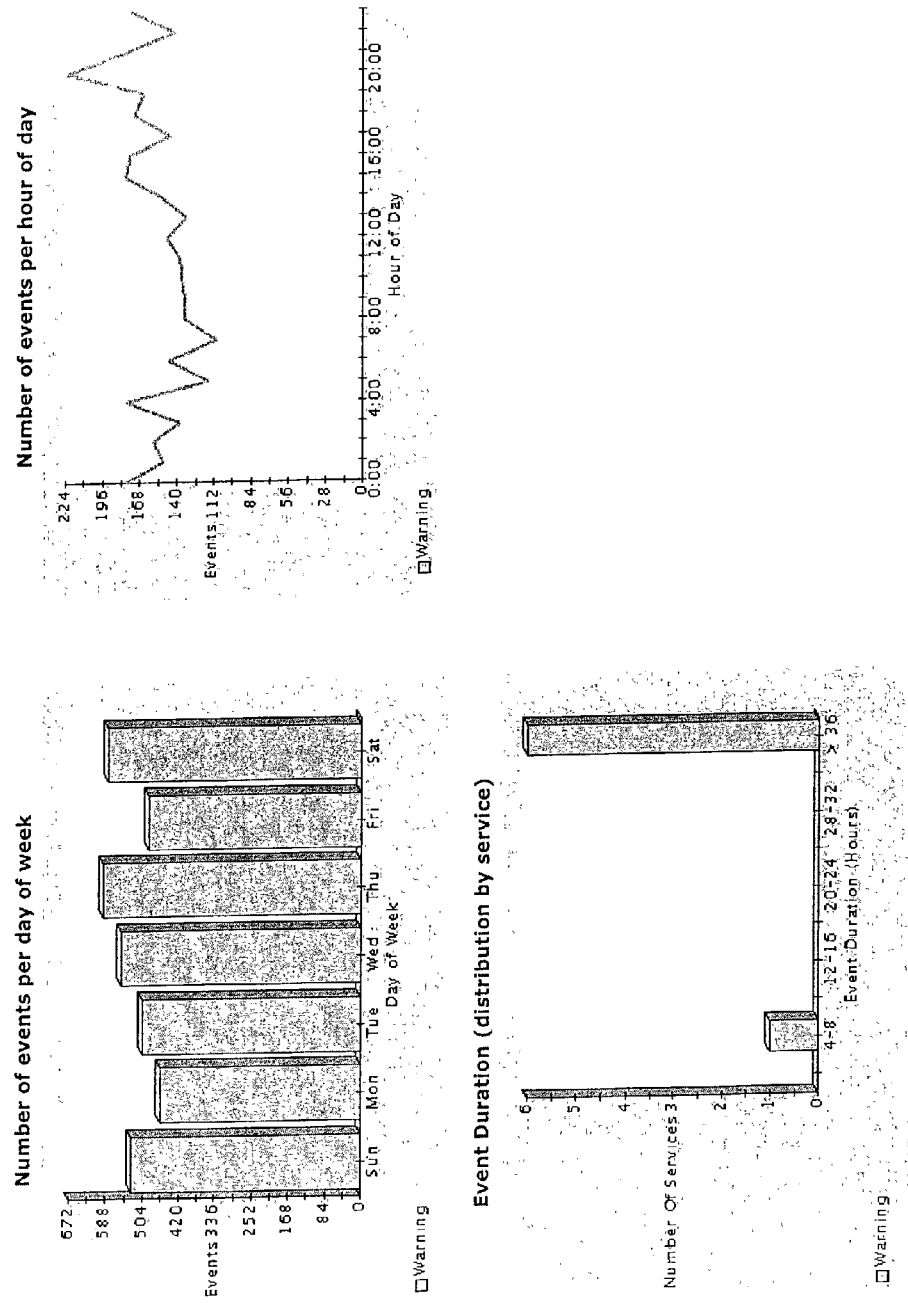

Trend reports can use regression algorithm for analyzing raw data and predicting the number of days to hit the specified thresholds. An exemplary service instability report is illustrated in FIGS. 14A and 14B. An exemplary usage and trend report is illustrated in FIG. 15.

Users can define custom reports in which devices, tests and the type of report to generate for these devices (e.g., top 10, events per day, statistical, trend, event distribution) are selected.

In one embodiment, the method 500 runs under an application server such as Jakarta Tomcat or BEA Weblogic.

§ 4.3.4 Exemplary Apparatus

Figure 18:
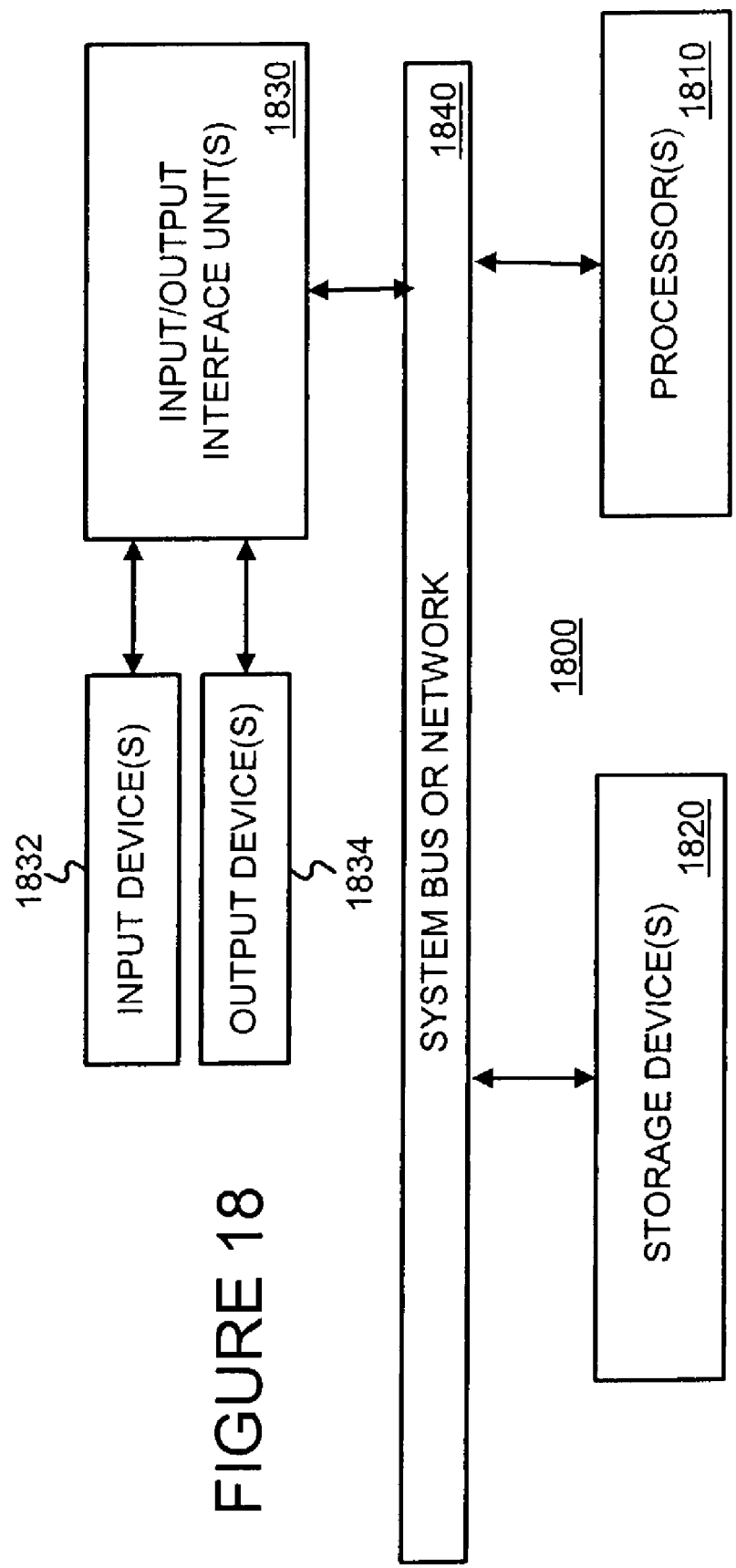
FIG. 18 is block diagram of apparatus that may be used to effect at least some aspects of the present invention.

FIG. 18 is high-level block diagram of a machine 1800 that may perform one or more of the operations discussed above. The machine 1800 basically includes a processor(s) 1810, an input/output interface unit(s) 1830, a storage device(s)1820, and a system bus or network 1840 for facilitating the communication of information among the coupled elements. An input device(s) 1832 and an output device(s) 1834 may be coupled with the input/output interface(s) 1830.

The processor(s) 1810 may execute machine-executable instructions (e.g., C or C++ or Java running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the storage device(s) 1820 and/or may be received from an external source via an input interface unit 1830.

In one embodiment, the machine 1800 may be one or more conventional personal computers. In this case, the processing unit(s) 1810 may be one or more microprocessors. The bus 1840 may include a system bus. The storage devices 1820 may include system memory, such as read only memory (ROM) and/or random access memory (RAM). The storage device(s) 1820 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1832, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1810 through an appropriate interface 1830 coupled to the system bus 1840.

The output device(s) 1834 may include a monitor or other type of display device, which may also be connected to the system bus 1840 via an appropriate interface. In addition to (or instead of) the monitor, the personal computer may include other (peripheral) output devices (not shown), such as speakers and printers for example.

§ 4.3.4 Additional Features

Various refinements to the present invention are now described. Various embodiments of the present invention may include some or all of these refinements.

§ 4.3.4.1 Smart Event Notification

A refined embodiment of the present invention can eliminate sending multiple notifications when a device goes down or is unavailable. Based on the inherent dependency between the ping packet loss test results and the availability of the device, if the ping packet loss test returns a CRITICAL result, then communication with the device has somehow been lost. Configured notifications for all other tests on the device are suppressed until packet loss returns to normal. Smart notification may include:

Suppressing alarms for all other device events. Smart alarming shows only actual failed tests.

Identifying relationships between devices to correlate and identify the actual point of network failure/outage and suppress alarms downstream.

Creating multi-level action profiles to handle event escalation.

§ 4.3.4.2 Device Dependencies

A refined embodiment of the present invention supports device dependencies to suppress excessive notifications when a gateway-type device has gone down or is unavailable. Switches, routers, and other hardware are often the physical gateways that govern whether other network devices are reachable. Monitoring of many devices may be impeded if one of these critical "parent devices" becomes unavailable. To provide correlation, a parent and child hierarchy is created between monitored devices in order to distinguish the difference between a CRITICAL test on a device and an UNREACHABLE one.

In many cases, a device is considered to be "reachable". However, if a test on a device is CRITICAL (for all thresholds), UNKNOWN, or FAILED, some additional processing is used to determine if the device is truly reachable. Such additional processing may involve the following. First, a current packet loss test is examined for the device. If such a test exists and the packet loss test result is not CRITICAL, the device is considered reachable. If no such test exists, all immediate parent devices are examined. If the device has no parents, the device is considered reachable and the result of the test is the measured value. The device is only considered unreachable if all the immediate parents have a "current" packet loss test result=100%. "Old" packet loss tests (those that occurred prior to the state change in the child's test result (i.e., OK to CRITICAL)) or the inexistence of a parent packet loss test for a parent has no effect on the result.

§ 4.3.4.3 Multi-Tiered Administration Model

A refined embodiment of the present invention supports a "federated user model". End user security may be controlled by permissions granted to a "User Group". Each end user can only belong to a single "Account", and each Account can only belong to a single User Group. Thus, an end user belongs to one and only one User Group for ease of administration. End users of one account are isolated from all other accounts, thus allowing various departments within an enterprise to each have a fully functional "virtual" copy of the invention.

Each User Group may have a unique privilege and limits matrix as defined by an Administrative user with administrative control over the User Group. Privileges for User Groups may be defined for devices, tests & actions. Limits at the User Group level may be defined for minimum test interval, max devices, max tests, max actions and max reports.

In addition to end-users, the system permits separate administrative users who can look at multiple 'accounts' (which a normal end-user cannot do). This framework allows senior management or central operation centers or customer care to report on multiple departments that they are responsible for. This eliminates the need for multiple deployments of the same product, while allowing seamless reporting across services that span IT infrastructure managed by different departments in an enterprise.

Administrative user security may be controlled by permissions granted to an Administrative Group. Administrative Groups and User Groups have a many-to-many relationship, allowing the administration of User Groups by numerous administrators who have varying permissions. Privileges for Administrative Groups may be defined for accounts, users, user groups, limits, devices, tests, and actions. A separate set of privileges is defined for each relationship between an Administrative Group and a User Group. A very simple configuration could establish the organization's Superuser as the only administrative user and all end-users belonging to a single User Group. In contrast, a complex organizational model might require the establishment of Administrative Groups for Network Administration, Database Administration, and Customer Service, with User Groups for C-level executives, IT Support, Marketing, etc.

Unlike administrators, the actions of "Superusers" are not constrained by a privileges matrix—they can perform any of the actions in the matrix on any user. Superusers create Administrative Groups and User Groups, and define the privileges the former has over the latter. The 'superuser' accounts are used to effectively bootstrap the system.

"Privileges" are the right to create, read, update, delete, suspend, etc. Each User Group has a privileges matrix associated with it that describes what operations the members of that User Group can perform. As mentioned previously, there is a similar, but more complex privileges matrix that describes what operations a member of an Administrative Group can do to administer one or more User Groups.

"Limits" are numerical bounds associated with a User Group that define minimum test interval, maximum devices, maximum tests, maximum actions and maximum reports for end-user accounts. An end user's actions are constrained by the Limits object associated with their User Group, unless there is another Limits object that is associated with the particular user (e.g. Read-only user) that would override the limits imposed by the User Group.

Administrative users occasionally need to directly administer an end-user's account, by logging into that account and providing on-line support to view the account and perform operations. This capability is especially helpful when an end-user's capabilities are limited to administer their own account. To circumvent the limited privileges of the end-user, the administrative user need not use the end-user's login/password, but rather "masquerades" as the end-user subject only to the administrative user's own privileges, which are often more extensive.

Administrators that have permissions to create end users and their accounts, have the option of creating users with read-only capabilities. In this way, administrators may give certain end users access to large amounts of data in the system, but without authority to change any of the characteristics of the devices, tests, actions or reports they are viewing.

When representing an end user, an administrator (if given proper create privileges) may create devices and tests for the end user in the end user's own account, via a "Represent" feature. One option the administrator has at the time of device creation is to make the device read-only. The tests on the read-only device become read-only as well. This feature was created to enable an end-user to observe the activity on a mission-critical network component, such as a switch or even a switch port, but not have the authority to modify its device or test settings.

§ 4.3.4.4 Graphical User Interface

Data may be collected from all DGEs and presented a consolidated view to the user primarily using a Web based interface. An end user only needs a commonly available Web browser to access the full functionality and reporting features of the product. Real-time status views are available for all accounts or devices or tests within an administrator's domain, all tests or devices or tests within an account, or all tests on a single device or device Group. Users can drill down on specific accounts, devices, and tests, and see six-hour, daily, weekly, monthly, and yearly performance information.

By using user administration pages, users can set default filters for the account and device summary pages to filter out devices in OK state, etc. For example, administrators may elect to filter out accounts and devices that are in an "OK" status. Especially for large deployments, this can dramatically cut down on the number of entries a user must scroll through to have a clear snapshot of system health. A toggle switch on the account and device summary pages may be used to quickly disable or enable the filter(s).

General administration features including: DGE location and host creation; administration of Administrative Group domains; Administration of User Group thresholds, privileges and actions; Account and user management; Administration of devices, device groups, tests and actions; and Password Management, all may be supported by a graphical user interface.

Via either an "Update Device" page or during device suspension, a user can enter a comment that will display on a "Device Status Summary" page. This could be used to identify why a device is being suspended, or as general information on the current state of the device.

§ 4.3.4.5 Integration with External Systems

The present invention can export data to other systems, or can send notifications to trouble ticketing or other NOC management tools. In addition, the present invention can import data from third party systems, such as OpenView from Hewlett-Packard, to provide a single administrative and analytical interface to all performance management measurements. More specifically, the present invention can import device name, IP address, SNMP community string and topology information from the HP OpenView NNM database, thereby complementing OpenView's topology discovery with the enhanced reporting capabilities of the present invention. Devices are automatically added/removed as the nodes are added or removed from NNM. Traps can be sent between NNM and the present invention as desired.

The present invention can open trouble tickets automatically using the Remedy notification plug in. It can automatically open trouble tickets in RT using the RT notification plug in.

§ 4.4 Exemplary Deployment and Administration

The following exemplifies how the present invention may be deployed on a system and administered. All configuration can be done by the GUI or via the API.

Physical locations (which are arbitrarily defined by the superuser) of where Data Gathering Elements are installed are created in the system. Recall that a DGE is a data collection agent assigned to a "location." To create a new DGE, its IP address and location are provided. Since multiple DGEs can exist in one location, soft and hard limits that define DGE load balancing may be set. The present invention may use a load balancing mechanism based on configurable device limits to ensure that DGE hosts are not overloaded. In this embodiment, each device is provisioned to a DGE when it is created based on the following heuristics:

1. Find a DGE that services the location of the device.
2. If there are many such DGEs and the user already has devices on one of them, pick that DGE.
3. If there are many DGEs where the user already has devices, choose the one that's the least loaded.
4. If there aren't any devices on which the user already has a device, pick the least loaded DGE that does service the location of the device.
5. Only pick a DGE that has available capacity—available is defined as "below critical level" if the DGE already has devices for the user, else "below warning level".
6. If there's no DGE that services the device location and has available capacity, log the error.

After creating the DGEs in the system, user groups and accounts are created in the configuration database. After this, devices and tests are provisioned in the system, typically using an auto-discovery tool which finds all IP devices and available tests on them in the given subnets. Default thresholds and actions are used if none is provided by the user. At this stage, the system is ready to be operational. When a DGE is enabled (either a process on the same machine as the configuration database or on another machine), it connects to the configuration database, identifies itself and downloads its configuration. After download its configuration, the DGE starts monitoring tests as described earlier.

The fault and performance monitoring system of the present invention can be set up and installed in a stand-alone environment in a few hours. Default test settings, action profiles, and reports may be pre-loaded into the system. Lists of devices can be batch-imported automatically into the system using the API.

§ 4.5 Conclusions

As can be appreciated from the foregoing disclosure, the present invention discloses apparatus, data structures and methods for combining system fault and performance monitoring. By using distributed data collection and storage of performance data, storage requirements are relaxed and real-time performance monitoring is possible. Data collection and storage elements can be easily configured via a central configuration database. The configuration database can be easily updated and changed. A federated user model allows normal end users to monitor devices relevant to the part of a service they are responsible for, while allowing administrative users to view the fault and performance of a service in an end-to-end manner across multiple accounts or departments.

What is claimed is:

1. A method for generating a report of performance of a system using data gathering elements distributed within the system, the method comprising:
   a) determining at least two appropriate data gathering elements;
   b) generating a query, to the determined at least two appropriate data gathering elements having information from which at least a portion of the report is generated, associated with the performance;
   c) disseminating the query to the determined at least two appropriate data gathering elements;
   d) accepting query responses from each of the at least two data gathering elements;
   e) combining information from the accepted query responses to generate system performance information; and
   f) generating a report using the system performance information.

2. The method of claim 1 wherein the act of generating a query associated with the performance includes
   i) determining an authorization of a user that requested the report, and
   ii) generating the query using a report type and the determined user authorization.

3. The method of claim 2 wherein the report type is associated with the user authorization.

4. The method of claim 2 wherein the report type is selected by the user, and
   wherein the report type is selected from a group consisting of (A) availability of a business service, (B) top N availability violations, and (C) top N accumulations of events recorded.

5. The method of claim 1 wherein the act of generating a query associated with the performance includes determining an authorization of a user that requested the report, wherein the authorization is associated with devices, wherein each of the data gathering elements is associated with devices, and wherein each of the at least two data gathering elements is associated with devices with which the authorization is also associated.

6. The method of claim 5 wherein each of the data gathering elements is associated with a location, and
   wherein the act of disseminating the query to at least two of the data gathering elements includes sending the query to the location associated with each of the at least two data gathering elements.

7. The method of claim 1 wherein the query is a relational database query.

8. The method of claim 1 wherein the report is an availability report based on event data which shows a number of threshold violations, a distribution of such violations and total downtime.

9. The method of claim 8 wherein the availability report is generated for one of (A) a device, (B) individual tests, and (C) a business service.

10. The method of claim 1 wherein the report displays the top predetermined number of event accumulations during the reporting period per account, per device, and per test.

11. The method of claim 10 wherein if the authorization is administrative, the report is provided at an account level and with links for more detailed reports on individual devices and tests.

12. The method of claim 1 wherein the report is a device performance report showing a period snapshot of event summaries for all tests on a single device.

13. The method of claim 1 wherein the report is a test details report showing all individual test results for a single test.

14. A machine readable medium storing machine executable instructions which, when executed by a machine, perform the method of claim 1.

15. The method of claim 1 wherein at least one of the data gathering elements is adapted to receive pushed data.

16. The method of claim 1 wherein the act of determining at least two appropriate data gathering elements includes
   i) accepting at least one of a user that requested the report and a report type, and
   ii) determining the at least two appropriate data gathering elements using at least one of the user and the report type, together with configuration information.

17. Apparatus for generating a report by one or more computers, of performance of a system using data gathering elements distributed within the system, the apparatus comprising:
   a) means for determining at least two appropriate data gathering elements having information from which at least a portion of the report is generated;
   b) means for generating a query, to the determined at least two appropriate data gathering elements, associated with the performance;
   c) means for disseminating the query to the determined at least two appropriate data gathering elements;
   d) an input for accepting query responses from each of the at least two data gathering elements;
   e) means for combining information from the accepted query responses to generate system performance information; and
   f) means for generating a report using the system performance information.

18. The apparatus of claim 17 wherein the means for generating a query associated with the performance include
   i) means for determining an authorization of a user that requested the report, and
   ii) means for generating the query using a report type and the determined user authorization.

19. The apparatus of claim 18 wherein the report type is associated with the user authorization.

20. The apparatus of claim 17 wherein the means for generating a query associated with the performance includes means for determining an authorization of a user that requested the report, the apparatus further comprising:
   f) data storage, the data storage storing
      i) an association of the authorization with devices,
      ii) an association of each of the data gathering elements with devices, wherein each of the at least two data gathering elements is associated with devices with which the authorization is also associated.

21. The apparatus of claim 20 wherein the data storage further stores an association of each of the data gathering elements with a location, and wherein the means for disseminating the query to at least two of the data gathering elements sends the query to the location associated with each of the at least two data gathering elements.

22. The apparatus of claim 17 wherein the query is a relational database query.

23. The apparatus of claim 17 wherein at least one of the data gathering elements is adapted to receive pushed data.

24. The apparatus of claim 17 wherein the means for determining at least two appropriate data gathering elements include i) means for accepting at least one of a user that requested the report and a report type, and ii) means for determining the at least two appropriate data gathering elements using at least one of the user and the report type together with configuration information.

* * * * *